US012635024B2

(12) United States Patent
Li et al.

(10) Patent No.: US 12,635,024 B2
(45) Date of Patent: May 19, 2026

(54) SYSTEMS AND METHODS FOR REDUCING UTILIZATION OF A RANDOM ACCESS PROCEDURE FOR SCHEDULING REQUEST TRANSMISSION IN A WIRELESS NETWORK

(71) Applicant: Telefonaktiebolaget LM Ericsson (publ), Stockholm (SE)

(72) Inventors: Haomin Li, Kanata (CA); Wei Wang, Kanata (CA); Rakesh Kappoor, Ottawa (CA)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 369 days.

(21) Appl. No.: 18/568,610

(22) PCT Filed: Jun. 9, 2021

(86) PCT No.: PCT/IB2021/055080
§ 371 (c)(1),
(2) Date: Dec. 8, 2023

(87) PCT Pub. No.: WO2022/259025
PCT Pub. Date: Dec. 15, 2022

(65) Prior Publication Data
US 2024/0284513 A1 Aug. 22, 2024

(51) Int. Cl.
*H04W 76/19* (2018.01)
*H04W 72/1268* (2023.01)
(Continued)

(52) U.S. Cl.
CPC ....... *H04W 76/19* (2018.02); *H04W 72/1268* (2013.01); *H04W 74/0833* (2013.01); *H04W 76/20* (2018.02)

(58) Field of Classification Search
CPC .................................................... H04W 76/19
See application file for complete search history.

(56) References Cited

U.S. PATENT DOCUMENTS 10,470,210 B2 * 11/2019 Yi ..................... H04W 28/0294
2021/0014028 A1 * 1/2021 You ...................... H04W 76/28
(Continued)

FOREIGN PATENT DOCUMENTS

EP 3914022 A1 11/2021
KR 20160138642 A 12/2016
(Continued)

OTHER PUBLICATIONS

International Search Report and Written Opinion dated Mar. 4, 2022 for International Application No. PCT/IB2021/055080 filed Jun. 9, 2021, consisting of 12-pages.
(Continued)

*Primary Examiner* — Guang W Li
(74) *Attorney, Agent, or Firm* — Weisberg I.P. Law, P.A.

(57) ABSTRACT

Systems and methods of the present disclosure are directed to a method. The method includes transmitting a Radio Resource Control (RRC) request or Scheduling Request (SR) via a random access procedure. The method includes receiving a Radio Link Control (RLC) Protocol Data Unit (PDU) including a RLC header and a RRC message, wherein the RLC header has an indication of an instruction to transmit an RLC status report. The method includes, responsive to transmitting, making a determination that a Wireless Communication Device (WCD) is to refrain from transmitting a SR via the random access procedure. The method includes, responsive to making the determination, transmitting a SR on Physical Uplink Control Channel (PUCCH) resource(s) of the PUCCH resource(s) indicated in the RRC message to obtain an uplink grant to transmit the RLC status report for the RLC PDU.

13 Claims, 19 Drawing Sheets

(51) Int. Cl.
H04W 74/0833 (2024.01)
H04W 76/20 (2018.01)

(56) References Cited

U.S. PATENT DOCUMENTS

| | | | | |
|---|---|---|---|---|
| 2021/0314810 A1* | 10/2021 | Kanamarlapudi | .... | H04W 72/23 |
| 2022/0105106 A1* | 4/2022 | Prevot | ..................... | A61P 25/28 |
| 2023/0024143 A1* | 1/2023 | Li | ........................ | H04W 74/04 |
| 2023/0048959 A1* | 2/2023 | Hu | ........................ | H04L 1/1883 |
| 2023/0319627 A1* | 10/2023 | Kanamarlapudi | .... | H04W 72/23 |
| | | | | 370/329 |

FOREIGN PATENT DOCUMENTS

| | | | | |
|---|---|---|---|---|
| WO | WO-2020135640 A1 * | 7/2020 | ............ | H04W 72/23 |
| WO | 2020156521 A1 | 8/2020 | | |

OTHER PUBLICATIONS

3GPP TS 38.321 V16.2.1; 3rd Generation Partnership Project; Technical Specification Group Radio Access Network; NR; Medium Access Control (MAC) protocol specification (Release 16); Sep. 2020, consisting of 154-pages.

3GPP TS 38.322 V16.1.0; 3rd Generation Partnership Project; Technical Specification Group Radio Access Network; NR; Radio Link Control (RLC) protocol specification (Release 16); Jul. 2020, consisting of 33-pages.

3GPP TS 38.331 V16.2.0; 3rd Generation Partnership Project; Technical Specification Group Radio Access Network; NR; Radio Resource Control (RRC) protocol specification (Release 16); Sep. 2020, consisting of 921-pages.

* cited by examiner

2000

1

SYSTEMS AND METHODS FOR REDUCING UTILIZATION OF A RANDOM ACCESS PROCEDURE FOR SCHEDULING REQUEST TRANSMISSION IN A WIRELESS NETWORK

CROSS-REFERENCE TO RELATED APPLICATIONS

This application is a Submission Under 35 U.S.C. § 371 for U.S. National Stage Patent Application of International Application Number: PCT/IB2021/055080, filed Jun. 9, 2021 entitled "SYSTEMS AND METHODS FOR REDUCING UTILIZATION OF A RANDOM ACCESS PROCEDURE FOR SCHEDULING REQUEST TRANSMISSION IN A WIRELESS NETWORK," the entirety of which is incorporated herein by reference.

TECHNICAL FIELD

The present disclosure relates generally to a method and a wireless communication device, for reducing random access procedure utilization in a wireless network.

BACKGROUND

SR Over PUCCH and SR Over RACH

In a wireless network, a Wireless Communication Device (WCD) (e.g., User Equipment (UE), etc.) can send a Scheduling Request (SR) to the network to request resources for Uplink (UL) data transmission. Normally, a SR is sent on a Physical Uplink Control Channel (PUCCH) using certain dedicated PUCCH resources and a certain PUCCH format. Once the SR is received by the network, the network sends an UL grant to the WCD that indicates UL resources for the UL data transmission.

While a SR is normally sent from the WCD to the network on a PUCCH using a certain PUCCH format, a WCD may also send a SR to the network via a random access procedure, which is also referred to as a Random Access Channel (RACH) procedure. More specifically, the RACH procedure is used by a WCD to request a connection setup and establish UL timing synchronization with the network. When a WCD establishes a Radio Resource Control (RRC) connection with the network without a dedicated PUCCH resource for SR being configured by the network, upon arrival of new data to the WCD's UL data buffer, the WCD triggers the random access procedure to obtain an UL grant from the network indicating UL resources that allow the WCD to send a buffer status report (BSR) and/or transmit UL data. Such behavior is oftentimes referred to as "SR over RACH".

During the random access procedure, the most conservative transport format is used for transmission of MSG2 (i.e., the Random Access Response (RAR)) and MSG3, and oftentimes MSG4, to secure robustness of the transmissions due to the lack of channel state information. For the same reason, a large Control Channel Element (CCE) aggregation level is typically needed for Downlink (DL) control channel allocation. Hence, a very limited number of RACH procedures can be supported simultaneously in a given cell. Further, any increased usage of the RACH procedure would impact the overall cell capacity and spectrum efficiency. Additionally, as compared with SR on PUCCH, SR over RACH typically would introduce longer delays in obtaining the needed UL grant from the network. The RACH procedure is often considered as one of the most expensive layer 1 (L1) procedures from both the resource efficiency perspective and the latency performance perspective.

RRC Reestablishment

RRC reestablishment is a mechanism initiated by the WCD to recover a lost radio connection to the network (e.g., caused by radio link failure, handover failure, etc.). FIG. 1 illustrates the steps of the RRC reestablishment procedure as currently defined in the Third Generation Partnership Project (3GPP) New Radio (NR). Notably, in this procedure, a configuration of a dedicated PUCCH SR resource is sent to the WCD in the RRC Reconfiguration message (step 4) over Signaling Radio Bearer 1 (SRB1) after the network has received the RRC Reestablishment Complete message (step 3).

RRC Resume

In addition to RRC connected and RRC IDLE mode, a new RRC state named RRC inactive state is introduced in 5G NR, as illustrated in FIG. 2. A WCD can move to the RRC inactive state if there is no activity from the WCD for a short time, instead of going into RRC IDLE state directly. With the RRC inactive state, the WCD is able to return to RRC connected state as quickly as possible. This allows the WCD to start transmitting with minimal latency compared to the RRC IDLE state. The RRC inactive state also allows the WCD to reduce battery power consumption relative to the RRC connected state.

The RRC resume procedure currently defined in the 3GPP specifications is illustrated in FIG. 3. The RRC resume procedure can be initiated by the WCD to resume a suspended RRC connection from an RRC inactive state. Notably, a configuration of a dedicated PUCCH SR resource is sent to the WCD in the RRC Resume message (step 2) over SRB1 after the network receives the RRC Resume Request (step 1).

RLC AM, RLC Status Report, and Polling Bit

The Radio Link Control (RLC) layer is a network layer between the Medium Access Control (MAC) layer (e.g., a "lower" layer) and Packet Data Convergence Protocol (PDCP)/RRC layer(s) (e.g., "upper" layer(s)). The RLC layer can be configured in three separate modes: Transparent Mode (TM), Unacknowledged Mode (UM), or Acknowledged Mode (AM). The DL RRC reconfiguration message (see step 4 of FIG. 1) and the DL RRC resume message (see step 2 of FIG. 3) can be sent over SRB1 using RLC AM mode. In the RLC AM mode, a polling bit is generally set for the transmission of a DL RRC reconfiguration/resume message. Since DL transmission empties the DL RLC buffer, an RLC status report is generated by the WCD in the UL in response to receiving the RRC reconfiguration/resume message. This RLC status report is generated by the WCD's RLC layer and is sent to layer 1 (L1, i.e., the Physical layer) for UL transmission.

Summary

Systems and methods are disclosed herein for reducing utilization of a random access procedure for the purpose of transmitting a scheduling request in a wireless network. In one embodiment, a method performed by a Wireless Communication Device (WCD) for reducing utilization of a random access procedure includes transmitting either (a) a Radio Resource Control (RRC) request or (b) a Scheduling Request (SR) via a random access procedure. The method further includes receiving a Radio Link Control (RLC) Protocol Data Unit (PDU). The RLC PDU includes a RLC header and a payload including an RRC message. The RLC header includes an indication of an instruction to transmit an RLC status report for the RLC PDU. The RRC message includes information that indicates one or more PUCCH resources configured for SR transmission. The method further includes, responsive to transmitting either the RRC request or the SR over via the random access procedure, making a determination that the wireless communication device is to refrain from transmitting a SR via the random access procedure to obtain an Uplink (UL) grant for transmission of the RLC status report for the RLC PDU. The method further includes, responsive to making the determination, transmitting a SR on at least one Physical Uplink Control Channel (PUCCH) resource of the one or more PUCCH resources configured for SR transmission indicated in the RRC message to obtain the UL grant for the transmission of the RLC status report for the RLC PDU. By refraining from transmitting a SR via the random access procedure in this manner, utilization of the random access procedure in the wireless network is substantially reduced.

In one embodiment, transmitting either (a) the RRC request or (b) the SR via the random access procedure includes transmitting the RRC request. In one embodiment, the RRC request includes a RRC resume request or a RRC reestablishment request.

In one embodiment, the transmitting of either (a) the RRC request or (b) the SR via the random access procedure includes transmitting the SR via the random access procedure in response to obtaining data via at least one of an Uplink Dedicated Control Channel (UL-DCCH) or an Uplink Dedicated Traffic Channel (UL-DTCH).

In one embodiment, making the determination that the wireless communication device is to refrain from transmitting a SR via the random access procedure includes determining that the wireless communication device is in a pending state. The pending state is a state in which the wireless communication device is prohibited from transmitting a SR via the random access procedure. In one embodiment, the method further includes, responsive to transmitting the SR, causing the wireless communication device to transition from the pending state to a non-pending state. The non-pending state is a state in which the wireless communication device is permitted to permit transmitting a SR via the random access procedure.

In one embodiment, the method further includes decoding the RRC message to determine the at least one PUCCH resource of the one or more PUCCH resources configured for SR transmission.

In one embodiment, the wireless communication device refrains from transmitting a SR via the random access procedure until a predetermined amount of time has passed since transmitting either (a) the RRC request or (b) the SR via the random access procedure.

In one embodiment, the method further includes starting a timer upon transmitting either (a) the RRC request or (b) the SR via the random access procedure. Making the determination that the wireless communication device is to refrain from transmitting the SR via the random access procedure includes determining that the timer has not expired, and then, responsive to determining that the timer has not expired, making the determination that the wireless communication device is to refrain from transmitting a SR via the random access procedure.

In one embodiment, the method further comprises transmitting the RLC status report on UL resources indicated by the UL grant obtained in response to transmitting the SR. The UL grant further includes a RRC completion message.

In one embodiment, the RLC status report includes a RLC acknowledgement or a RLC negative acknowledgement. The RRC message includes a RRC reconfiguration message or a RRC resume message.

Another example aspect of the present disclosure is directed to a wireless communication device for reducing utilization of a random access procedure. The wireless communication device is adapted to transmit either (a) a RRC request or (b) a SR over via a random access procedure. The wireless communication device is adapted to receive a RLC PDU. The RLC PDU includes a RLC header and a payload including an RRC message. The RLC header includes an indication of an instruction to transmit an RLC status report for the RLC PDU. The RRC message includes information that indicates one or more PUCCH resources configured for SR transmission. The wireless communication device is adapted to, responsive to transmitting either the RRC request or the SR via the random access procedure, make a determination that the wireless communication device is to refrain from transmitting a SR via the random access procedure to obtain a UL grant for transmission of the RLC status report for the RLC PDU. The wireless communication device is adapted to, responsive to making the determination, transmit a SR on at least one PUCCH resource of the one or more PUCCH resources configured for SR transmission indicated in the RRC message to obtain the UL grant for the transmission of the RLC status report for the RLC PDU.

Another aspect of the present disclosure is directed to a wireless communication device for reducing utilization of a random access procedure. The wireless communication device includes one or more transmitters. The wireless communication device includes one or more receivers. The wireless communication device includes processing circuitry associated with the one or more transmitters and the one or more receivers. The processing circuitry is configured to cause the wireless communication device to transmit either (a) a RRC request or (b) a SR via a random access procedure. The processing circuitry is configured to cause the wireless communication device to receive a RLC PDU. The RLC PDU includes a RLC header and a payload including an RRC message. The RLC header includes an indication of an instruction to transmit an RLC status report for the RLC PDU. The RRC message includes information that indicates one or more PUCCH resources configured for SR transmission. The processing circuitry is configured to cause the wireless communication device to, responsive to transmitting either the RRC request or the SR via the random access procedure, a determination that the wireless communication device is to refrain from transmitting a SR via the random access procedure to obtain an UL grant for transmission of the RLC status report for the RLC PDU. The processing circuitry is configured to cause the wireless communication device to, responsive to making the determination, transmit a SR on at least one PUCCH resource of the one or more PUCCH resources configured for SR transmission indicated in the RRC message to obtain the UL grant for the transmission of the RLC status report for the RLC PDU.

Another aspect of the present disclosure is directed to a method performed by a network node for reducing utilization of a random access procedure. The method includes receiving, from a wireless communication device, either (a)

a RRC request or (b) a SR via a random access procedure. The method includes, responsive to receiving either (a) the RRC request or (b) the SR via the random access procedure, transmitting, to the wireless communication device, a RLC PDU. The RLC PDU includes an RLC header and a payload including an RRC message. The RLC header includes an indication of an instruction that the wireless communication device is to refrain from transmitting an RLC status report for the RLC PDU. The RRC message includes information that indicates one or more PUCCH resources configured for SR transmission.

In one embodiment, the indication of the instruction that the wireless communication device is to refrain from transmitting an RLC status report for the RLC PDU includes, within the RLC header, a poll bit with a value set to 0.

In one embodiment, the method further includes making a determination that a predetermined amount of time has passed without receipt of an SR from the wireless communication device via at least one of the one or more PUCCH resources configured for SR transmission indicated in the RRC message. In one embodiment, making the determination that the predetermined amount of time has passed without receipt of an SR from the wireless communication device via at least one of the one or more PUCCH resources includes starting a timer upon transmitting the RLC PDU, determining that the timer has expired, and, responsive to determining that the timer has expired, making the determination that the predetermined amount of time has passed without receipt of the SR from the wireless communication device via the at least one of the one or more PUCCH resources configured for SR transmission indicated in the RRC message.

In one embodiment, the method further includes, responsive to making the determination, transmitting, to the wireless communication device, a modified RLC PDU. The modified RLC PDU includes a modified RLC header and a payload that includes a RRC message. The modified RLC header includes an indication of an instruction that the wireless communication device is to transmit an RLC status report for the modified RLC PDU. The RRC message includes information that indicates the one or more PUCCH resources configured for SR transmission.

In one embodiment, the method further includes, responsive to making the determination, transmitting, to the wireless communication device, a dummy RLC PDU. The dummy RLC PDU includes a modified RLC header. The modified RLC header includes an indication of an instruction that the wireless communication device is to transmit an RLC status report for the dummy RLC PDU.

Another aspect of the present disclosure is directed to a network node for reducing utilization of a random access procedure. The network node is adapted to receive, from a wireless communication device, either (a) a RRC request or (b) a SR via a random access procedure. The network node is adapted to, responsive to receiving either (a) the RRC request or (b) the SR via the random access procedure, transmit, to the wireless communication device, a RLC PDU. The RLC PDU includes an RLC header and a payload including an RRC message. The RLC header includes an indication of an instruction that the wireless communication device is to refrain from transmitting an RLC status report for the RLC PDU. The RRC message includes information that indicates one or more PUCCH resources configured for SR transmission.

Another aspect of the present disclosure is directed to a network node. The network node includes processing circuitry. The processing circuitry is configured to cause the network node to receive, from a wireless communication device, either (a) a RRC request or (b) a SR via a random access procedure. The processing circuitry is configured to cause the network node to, responsive to receiving either (a) the RRC request or (b) the SR via the random access procedure, transmit, to the wireless communication device, a RLC PDU. The RLC PDU includes an RLC header and a payload including an RRC message. The RLC header includes an indication of an instruction that the wireless communication device is to refrain from transmitting an RLC status report for the RLC PDU. The RRC message includes information that indicates one or more PUCCH resources configured for SR transmission.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

Figure 1:
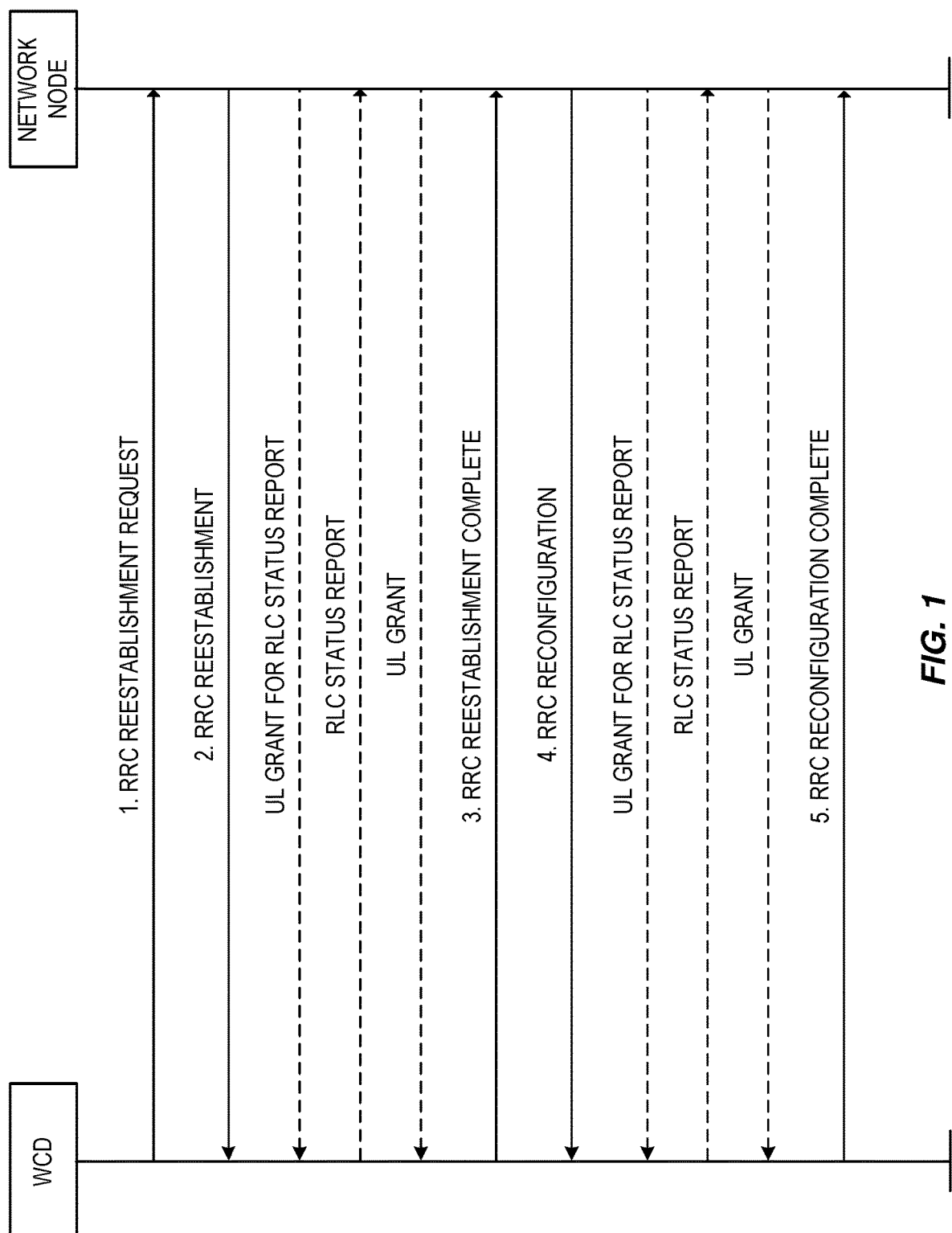
FIG. 1 depicts a data flow diagram of example steps of the Radio Resource Control (RRC) reestablishment procedure as currently defined in the Third Generation Partnership Project (3GPP) New Radio (NR).

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Radio Node: As used herein, a "radio node" is either a radio access node or a wireless communication device.

Radio Access Node: As used herein, a "radio access node" or "radio network node" or "radio access network node" is any node in a Radio Access Network (RAN) of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), a relay node, a network node that implements part of the functionality of a base station or a network node that implements a gNB Distributed Unit (gNB-DU)) or a network node that implements part of the functionality of some other type of radio access node.

Core Network Node: As used herein, a "core network node" is any type of node in a core network or any node that implements a core network function. Some examples of a core network node include, e.g., a Mobility Management Entity (MME), a Packet Data Network Gateway (P-GW), a Service Capability Exposure Function (SCEF), a Home Subscriber Server (HSS), or the like. Some other examples of a core network node include a node implementing an Access and Mobility Function (AMF), a User Plane Function (UPF), a Session Management Function (SMF), an Authentication Server Function (AUSF), a Network Slice Selection Function (NSSF), a Network Exposure Function (NEF), a Network Function (NF) Repository Function (NRF), a Policy Control Function (PCF), a Unified Data Management (UDM), or the like.

Communication Device: As used herein, a "communication device" is any type of device that has access to an access network. Some examples of a communication device include, but are not limited to: mobile phone, smart phone, sensor device, meter, vehicle, household appliance, medical appliance, media player, camera, or any type of consumer electronic, for instance, but not limited to, a television, radio, lighting arrangement, tablet computer, laptop, or Personal Computer (PC). The communication device may be a portable, hand-held, computer-comprised, or vehicle-mounted mobile device, enabled to communicate voice and/or data via a wireless or wireline connection.

Wireless Communication Device: One type of communication device is a wireless communication device, which may be any type of wireless device that has access to (i.e., is served by) a wireless network (e.g., a cellular network). Some examples of a wireless communication device include, but are not limited to: a User Equipment device (UE) in a 3GPP network, a Machine Type Communication (MTC) device, and an Internet of Things (IoT) device. Such wireless communication devices may be, or may be integrated into, a mobile phone, smart phone, sensor device, meter, vehicle, household appliance, medical appliance, media player, camera, or any type of consumer electronic, for instance, but not limited to, a television, radio, lighting arrangement, tablet computer, laptop, or PC. The wireless communication device may be a portable, hand-held, computer-comprised, or vehicle-mounted mobile device, enabled to communicate voice and/or data via a wireless connection.

Network Node: As used herein, a "network node" is any node that is either part of the RAN or the core network of a cellular communications network/system.

Transmission/Reception Point (TRP): In some embodiments, a TRP may be either a network node, a radio head, a spatial relation, or a Transmission Configuration Indicator (TCI) state. A TRP may be represented by a spatial relation or a TCI state in some embodiments. In some embodiments, a TRP may be using multiple TCI states. In some embodiments, a TRP may be a part of the gNB transmitting and receiving radio signals to/from a WCD according to physical layer properties and parameters inherent to that element. In some embodiments, in Multiple TRP (multi-TRP) operation, a serving cell can schedule WCD from two TRPs, providing better Physical Downlink Shared Channel (PDSCH) coverage, reliability and/or data rates. There are two different operation modes for multi-TRP: single Downlink Control Information (DCI) and multi-DCI. For both modes, control of Uplink (UL) and Downlink (DL) operation is done by both physical layer and Medium Access Control (MAC). In single-DCI mode, a WCD is scheduled by the same DCI for both TRPs and in multi-DCI mode, the WCD is scheduled by independent DCIs from each TRP.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

Before describing embodiments of the present disclosure, a description of several problems associated with the existing Radio Resource Control (RRC) reestablishment, RRC resume, and RRC reconfiguration procedure is beneficial. As the number of RRC connected WCDs increases in a network, it becomes increasingly likely that a WCD will not be configured with a dedicated Physical Uplink Control Channel (PUCCH) Scheduling Request (SR) resource or that the WCD will have already released its dedicated PUCCH SR resource after reaching a maximum allowable number of SR transmission without receiving an UL grant. In either of these situations, the WCD will send an initial SR via Random Access Channel (RACH) procedure (i.e., "SR over RACH").

Figure 4:
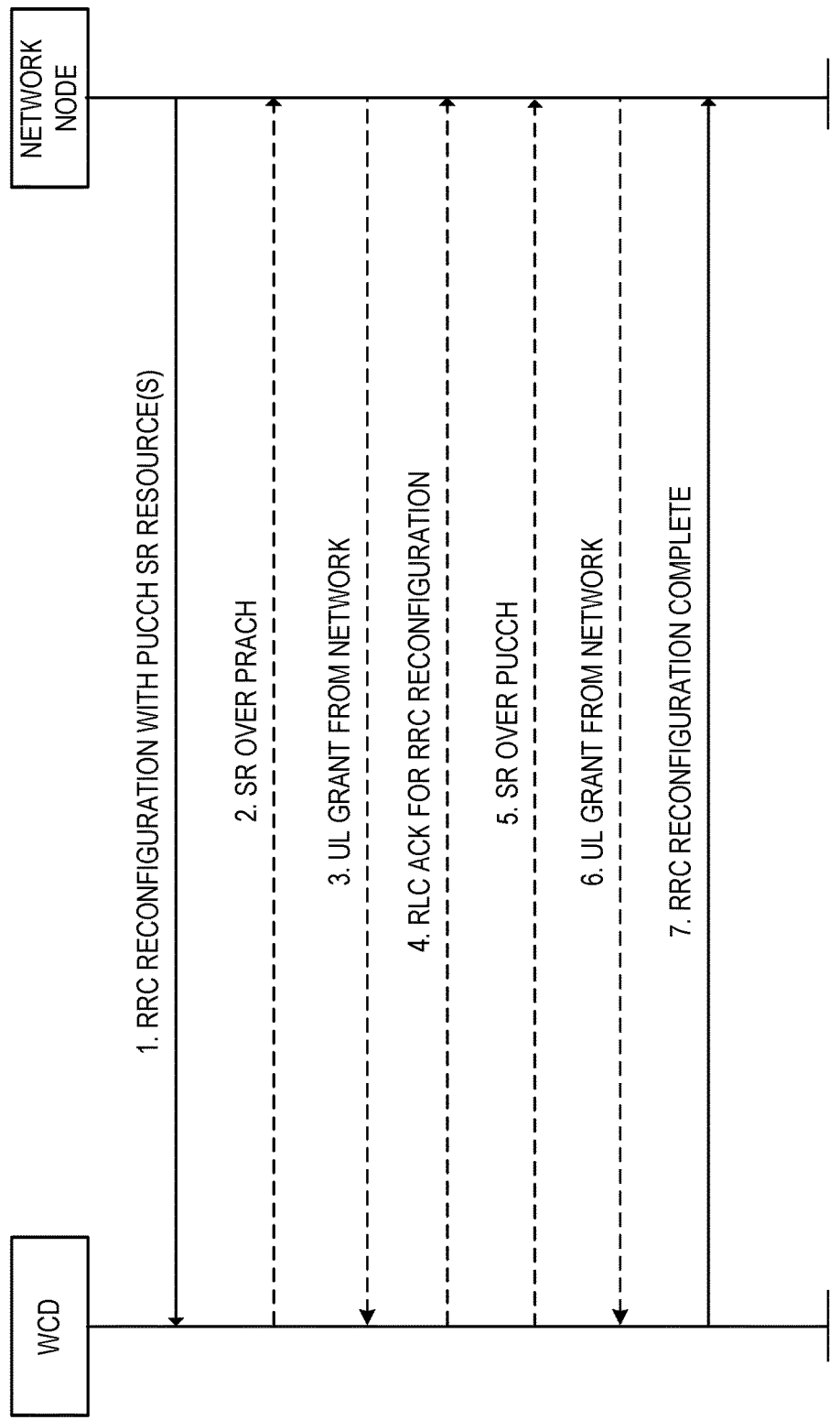
FIG. 4 depicts a data flow diagram of an example utilization of random access procedure caused by RRC reestablishment procedure as currently defined in the 3GPP NR.

After the WCD has sent the SR over RACH, the network will then typically try to configure a dedicated PUCCH SR resource for the WCD via a RRC Reconfiguration message to prevent the WCD from continuing to perform SR over RACH for all future UL transmissions, which would be extremely costly. For this RRC Reconfiguration message, it is sent over Signaling Radio Bearer 1 (SRB1) using Radio Link Control (RLC) Acknowledged Mode (AM) mode where the poll bit is also set in the same DL transmission. In other words, a RLC status report in the UL corresponding to this DL transmission that contains the RRC Reconfiguration message is expected to be sent from the WCD to the network. In order to transmit this RLC status report, a SR needs to be sent to request UL resource for the transmission. If the WCD has successfully decoded the RRC Reconfiguration message that contains a configuration of a dedicated PUCCH SR resource by the time that the RLC status report has been generated, the RLC status report can be sent with a SR on PUCCH. However, given that RLC is a layer 2 (L2) protocol and the RRC Reconfiguration message is part of the Layer 3 (L3) procedure delivered as the Service Data Unit (SDU) of RLC, the RLC status report will always be generated and sent to L1 for transmission before the PUCCH SR resource configuration is available to be used by layer 1 (L1). As a result, the WCD will always trigger another SR over RACH to deliver the RLC status report for the DL RLC PDU that contains RRC Reconfiguration message. This problem is illustrated in FIG. 4, particularly by the SR over Physical Random Access Channel (PRACH) in step 2.

Similar problems exist with respect to the RRC Reestablishment and RRC Resume procedures. In regard to the RRC Reestablishment procedure, in the first RRC Reconfiguration message (see step 3 of FIG. 1) after RRC reestablishment, a PUCCH SR resource is configured to the WCD. An RLC status report is expected to be generated by the WCD for acknowledging receipt of the DL RLC PDU that contains the RRC reconfiguration message. If the WCD has successfully decoded the RRC Reconfiguration message which contains configuration of the dedicated PUCCH SR resource by the time that the RLC status report is generated, then the RLC status report can be sent with a SR on the PUCCH SR resource. However, the RLC status report will always be generated by the RLC layer (L2) and sent to L1 for transmission before PUCCH SR resource (from L3) is available in L1. As a result, the WCD will always use a SR over RACH procedure to deliver RLC status report for the RRC Reconfiguration message. This problem is illustrated in step 8 of FIG. 5.

Figure 3:
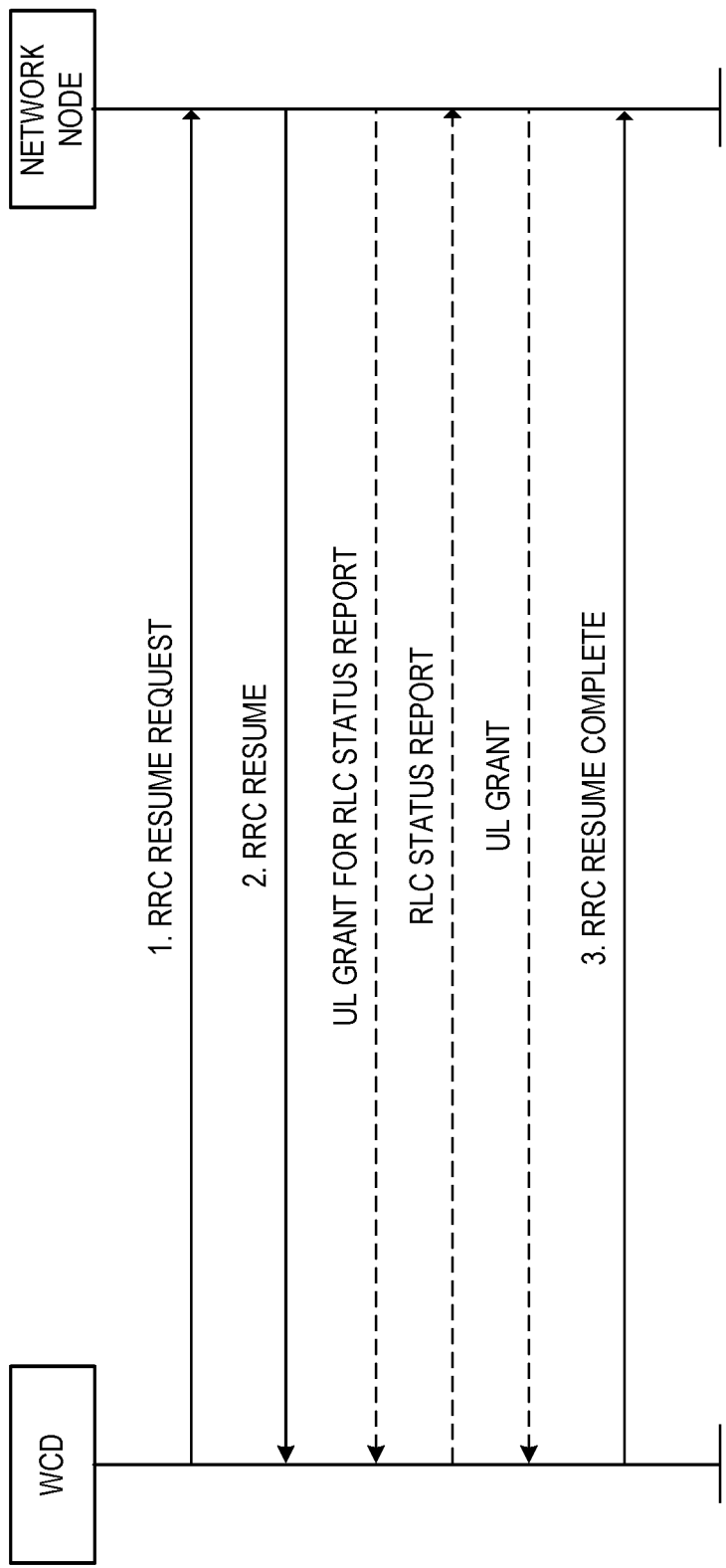
FIG. 3 depicts a data flow diagram of example steps of the RRC resume procedure as currently defined in the 3GPP NR.

The same problem exists in the RRC Resume procedure where PUCCH SR resource is configured in RRC Resume message (see step 2 of FIG. 3). An RLC status report will need to be sent from the WCD and most likely the WCD will initiate RACH procedure for the purpose of delivery of the RLC status report (see step 3 of FIG. 6).

The problems described above result in an excessive amount of RACH usage, which consume a lot of radio resources in the network and decreases the capacity of the network. A simple solution would be utilizing pre-scheduling for the delivery of RLC status reports. Pre-scheduling is a method by which the network blindly and proactively provides an UL grant to a WCD including UL resources so that the WCD will be able to transmit UL data without going through a SR procedure. Pre-scheduling is commonly used to secure the best UL latency performance. One way to prevent another random access from network side is to keep pre-scheduling the WCD on the UL upon the reception of DL acknowledgment that corresponds to the transmission of RRC Reconfiguration message. However, the main concern with pre-scheduling is that it will waste PUCCH resources as the network will grant resources for UL transmission that may not be used by the WCD. The network does not know the exact time at which that WCD will be ready for UL RRC message transmission, so the UL grant needs to be scheduled as early and frequently as possible, even every Transmit Time Interval (TTI), in order to avoid another RACH process. This pre-scheduling solution is also very expensive and resource-consuming from a system point of view.

Systems and methods are described herein that address the aforementioned and/or other problems with existing solutions. Briefly described, embodiments are described herein that reduce random access procedure utilization in a wireless network due to excessive use of SR over RACH. In one embodiment, a WCD transmits either a RRC request (e.g., a RRC reestablishment request, a RRC resume request, etc.) or a SR over RACH. In response, the WCD receives a RLC PDU including an RLC header and a payload that includes a RRC message (e.g., a RRC reconfiguration message, etc.). The RLC header includes an indication of an instruction (e.g., a poll bit set to 1, etc.) to transmit an RLC status report for the RLC PDU (e.g., an RLC acknowledgement, an RLC negative acknowledgement, etc.). The RRC message further includes information that indicates a PUCCH resource(s) configured for SR transmission for utilization by the WCD. In response, the WCD makes a determination that the WCD is to refrain from transmitting a SR via RACH to obtain a UL grant for transmission of the RLC status report for the RLC PDU. Responsive to making this determination, the WCD refrains from transmitting a SR over RACH (e.g., by waiting for the indicated PUCCH resource(s) to be available as a result higher layer processing), and the WCD transmits a SR on at least one of the one or more PUCCCH resources indicated in the RRC message to obtain a UL grant to transmit the RLC status report for the RLC PDU. In such fashion, by refraining from immediately transmitting an SR for a UL grant transmission of the RLC status report as instructed by the RLC header, the RRC message of the RLC PDU can be decoded (e.g., at a layer of the WCD, etc.), allowing for the indicated PUCCH resource(s) to be utilized and therefore eliminating a source of random access procedure utilization by the WCD.

According to another aspect of the present disclosure, at least a portion of a wireless network (e.g., a network node, a base station, etc.) reduces random access procedure utilization in the wireless network. In one embodiment, a network node transmits a RLC PDU to a WCD. The RLC PDU includes an RLC header and a payload that includes an RRC message. The RLC header includes an indication of an instruction that the WCD is to refrain from transmitting an RLC status report (e.g., an RLC acknowledgement, an RLC negative acknowledgement, etc.) for the RLC PDU. For example, a polling bit may be set to 0. The RRC message includes information that indicates one or more PUCCH resources configured for SR transmission for utilization by the WCD. In such fashion, by instructing the WCD to refrain from transmitting an RLC status report, the network node can obviate the need for the WCD to transmit a SR via RACH to request a UL grant for RLC status report transmission, therefore eliminating a source of random access procedure utilization by the WCD.

Systems and methods of the present disclosure provide a number of technical effects and benefits. As one example technical effect and benefit, the WCD can make a determination to refrain from transmitting a SR via random access procedure to obtain a UL grant for transmission of a RLC status report, therefore reducing overall random access procedure utilization in the network. As described previously, utilization of random access procedure requires substantially more network resources than other methods such as SR over dedicated PUCCH resource(s) (e.g., less processing cycle(s), memory resources, power, etc.). By reducing random access procedure utilization, the systems and methods of the present disclosure can significantly increase efficiency in a wireless network, and therefore substantially reduce utilization of network resources in a wireless network (e.g., processing cycle(s), memory resources, power, etc.).

Figure 7:
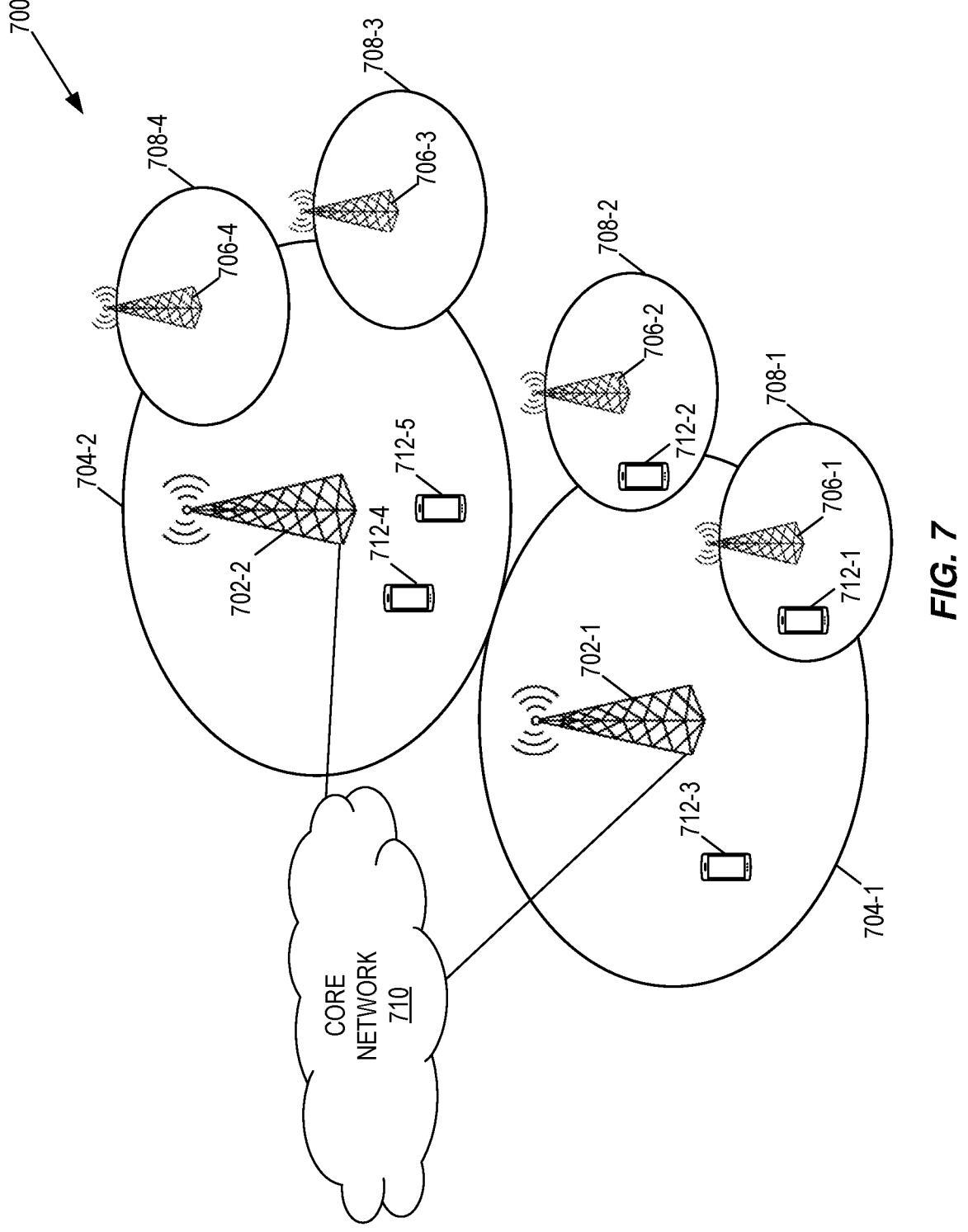
FIG. 7 illustrates one example of a cellular communications system according to some embodiments of the present disclosure.

FIG. 7 illustrates one example of a cellular communications system 700 in which embodiments of the present disclosure may be implemented. In the embodiments described herein, the cellular communications system 700 is a 5G system (5GS) including a Next Generation RAN (NG-RAN) and a 5G Core (5GC) or an Evolved Packet System (EPS) including an Evolved Universal Terrestrial RAN (E-UTRAN) and an Evolved Packet Core (EPC). In this example, the RAN includes base stations 702-1 and 702-2, which in the 5GS include gNBs and optionally next generation eNBs (ng-eNBs) (e.g., LTE RAN nodes connected to the 5GC) and in the EPS include eNBs, controlling corresponding (macro) cells 704-1 and 704-2. The base stations 702-1 and 702-2 are generally referred to herein collectively as base stations 702 and individually as base station 702. Likewise, the (macro) cells 704-1 and 704-2 are generally referred to herein collectively as (macro) cells 704 and individually as (macro) cell 704. The RAN may also include a number of low power nodes 706-1 through 706-4 controlling corresponding small cells 708-1 through 708-4. The low power nodes 706-1 through 706-4 can be small base stations (such as pico or femto base stations) or Remote Radio Heads (RRHs), or the like. Notably, while not illustrated, one or more of the small cells 708-1 through 708-4 may alternatively be provided by the base stations 702. The low power nodes 706-1 through 706-4 are generally referred to herein collectively as low power nodes 706 and individually as low power node 706. Likewise, the small cells 708-1 through 708-4 are generally referred to herein collectively as small cells 708 and individually as small cell 708. The cellular communications system 700 also includes a core network 710, which in the 5GS is referred to as the 5GC. The base stations 702 (and optionally the low power nodes 706) are connected to the core network 710.

The base stations 702 and the low power nodes 706 provide service to wireless communication devices 712-1 through 712-5 in the corresponding cells 704 and 708. The wireless communication devices 712-1 through 712-5 are generally referred to herein collectively as wireless communication devices 712 and individually as wireless communication device 712. In the following description, the wireless communication devices 712 are oftentimes UEs, but the present disclosure is not limited thereto.

Figure 8:
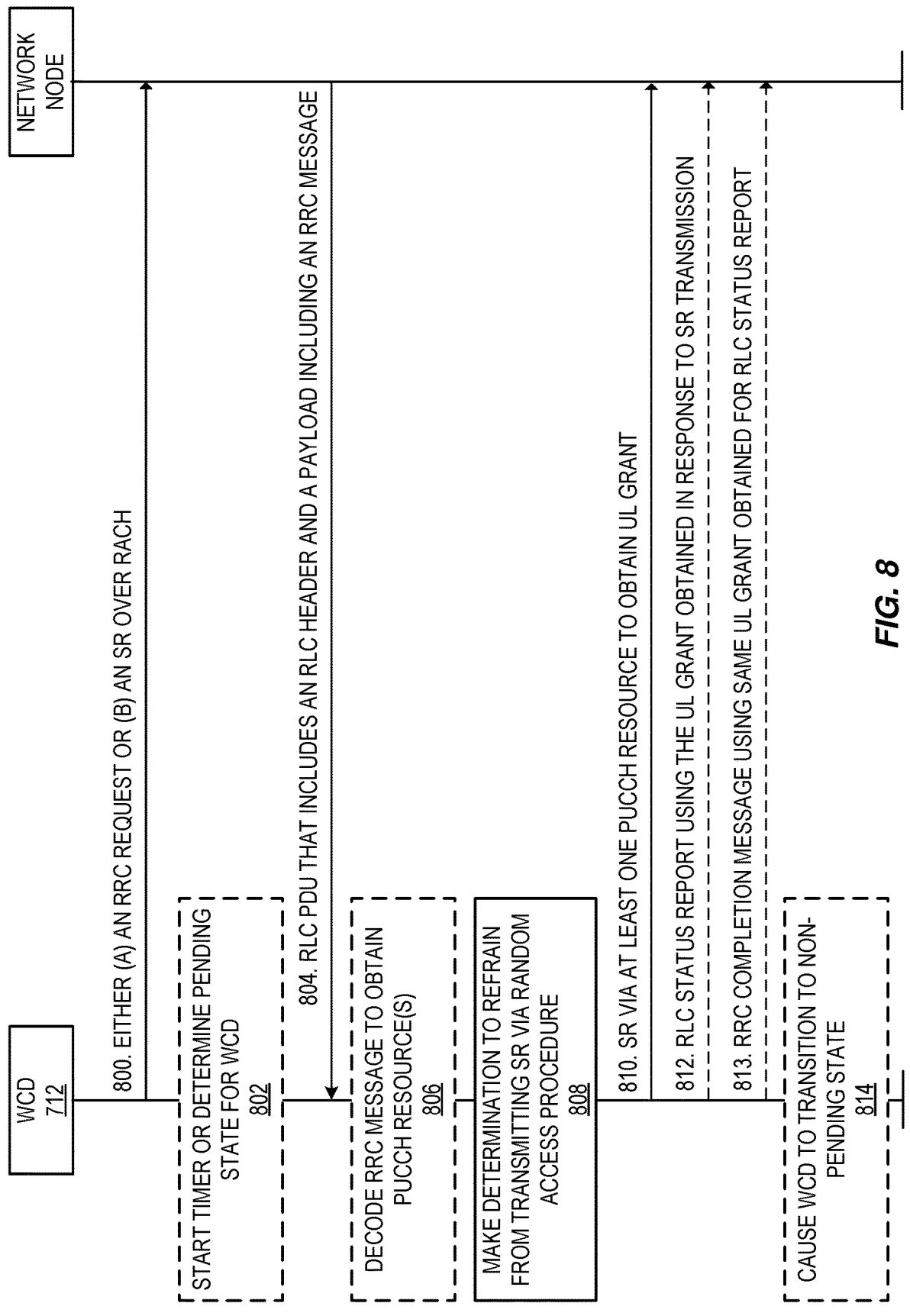
FIG. 8 illustrates the operation of a wireless communication device to reduce random access procedure utilization according to some embodiments of the present disclosure.

FIG. 8 illustrates the operation of a WCD 712 and a network node (e.g., a base station 702 or a network node (e.g., a gNodeB control unit (gNB-CU) that implements at least part of the functionality of a base station 702) in accordance with at least some aspects of the embodiments described herein. Note that according to some embodiments, one or more steps in FIG. 8 can be performed, while other steps are optional. For example, step(s) indicated by a dashed box may be optional (e.g., step 802, etc.).

As illustrated, at step 800, the WCD 712 transmits either (a) a RRC request or (b) a SR via random access procedure (also referred to herein as SR over RACH) to the network node. In one embodiment, the WCD 712 transmits a RRC request in step 800, where the RRC request is a RRC reestablishment request, a RRC resume request, or other similar RRC request.

At step 802, the WCD 712, in some implementations, starts a timer and/or determines that the WCD 712 is in or is to entered a pending state. For example, prior to step 800, the WCD 712 may be in a non-pending state (e.g., an RRC_INACTIVE state, an RRC_CONNECTED, state, etc.). Then, after transmitting either (a) an RRC request or (B) an SR via random access procedure to the network node in step 800, the WCD 712 determines that it is to enter the pending state (e.g., an RRC_INACTIVE_SR_PENDING state, a RC_CONNECTED_SR_PENDING state, etc.) in step 802. The pending state is a state in which the WCD 712 is prohibited from or otherwise refrains from transmitting a SR via random access procedure.

Alternatively, or additionally, in some implementations, the WCD 712 starts a timer at step 802. More particularly, optionally, the WCD 712 starts a timer to refrain from transmitting a SR via random access procedure until a predetermined amount of time has passed since transmitting either (a) the RRC request or (b) the SR via random access procedure (e.g., step 800, etc.). As an example, the WCD 712 starts this timer upon transmitting at step 800 (e.g., simultaneously, or near-simultaneously performing steps 800 and 802, etc.). The WCD 712 then refrains from transmitting a SR via random access procedure until the timer has expired (e.g., a certain amount of time has passed, etc.).

In some implementations, the WCD 712 both starts a timer and determines that is it in or is to enter a pending state in step 802.

At step 804, the WCD 712 receives a RLC PDU from the network node. The RLC PDU includes a RLC header and a payload including an RRC message. The RLC header includes an indication of an instruction to transmit an RLC status report for the RLC PDU (e.g., a RLC acknowledgement, a RLC negative acknowledgement, etc.). In one embodiment, the indication included in the RLC header is a polling bit (e.g., the RLC AM polling bit) that is set to a positive value (e.g., "1", etc.). The positively set poll bit indicates the instruction to the WCD 712 to transmit the RLC status report. The RRC message included in the payload of the RLC PDU may be, e.g., a RRC reconfiguration message, etc.). The RRC message includes information that indicates one or more PUCCH resources configured for the WCD 712 for SR transmission (e.g., indicates a first symbol(s), duration(s), Physical Resource Block (PRB) offset(s), cyclic shift index set(s), etc. of the PUCCH resource(s)).

At step 806, the WCD 712, optionally, decodes the RRC message to obtain at least one of the one or more PUCCH resource(s) indicated in the RRC message. As an example, the RRC message included in the payload of the RLC PDU may be encoded (e.g., using a conventional encoding scheme, using an encoding scheme specified under 3GPP, etc.). The RRC message is thus decoded to obtain the at least one of the one or more PUCCH resources (i.e., to obtain the configuration of the PUCCH resource(s) included in the RRC message). As a more particular example, the RRC message is provided to the RRC/PDCP layer of the WCD 712 (e.g., a level 3 layer, etc.), where the RRC message is processed to obtain the at least one of the one or more PUCCH resources.

At step 808, the WCD 712 decides that the WCD 712 is to refrain from transmitting a SR via random access procedure to obtain a UL grant for transmission of an RLC status report for the RLC PDU. As an example, the RLC PDU includes an indication of an instruction to transmit an RLC status report for the RLC PDU as described with regards to step 804. To follow this indicated instruction, the WCD 712 first needs to send a SR to the network node to obtain a UL grant for transmission of the RLC status report. However, as the RLC layer is a level 2 layer, and the RRC layer is a level 3 layer, the WCD 712 will conventionally act upon the indicated instruction before the RRC layer has processed the RRC message and thus before the indicated PUCCH resource(s) is available to L1 for transmission of the RLC status report. As the PUCCH resource(s) are not yet obtained by Packet Data Convergence (PDCP)/RRC processing, they are therefore not normally available at the time that the RLC status report is generated by the RLC layer and send L1 for transmission. As a result, if it were using conventional technology, the WCD 712 would transmit an SR via random access procedure to the network node to obtain an UL grant for transmission of the RLC status report.

Conversely, by making the determination to refrain from sending the SR via random access procedure at step 808, the WCD 712 allows for the one of the one or more PUCCH resources indicated by the RRC message to be obtained via higher layer processing before transmission of the RLC status report. As such, the WCD 712 can instead utilize at least one of the one or more PUCCH resources indicated in the RRC message for transmission of a SR and therefore obviate the need for transmission of the SR via random access procedure.

More specifically, at step 810, the WCD 712 transmits a SR via at least one of the one or more PUCCH resources indicated by the information included in the RRC message. To follow the previously described example, the determination can be made to refrain from transmitting a SR via random access procedure for subsequent transmission of a SR to obtain a UL grant for transmission of the RLC status report. The WCD 712 therefore waits for processing of the RRC message by the higher layers such that the indicated PUCCH resource(s) can be utilized to send a SR. At Step 812, the WCD 712 optionally utilizes the UL grant obtained in response to transmitting the SR to transmit the RLC status report. For example, the network node provides an UL grant in response to receiving the SR via the at least one PUCCH resources configured for SR transmission. The RLC status report is then transmitted using the UL grant.

Additionally, at step 813, the WCD 712 optionally transmits a RRC completion message (e.g., a RRC reestablishment completion message, a RRC resume completion message, etc.) using the same UL grant as is used for transmission of the RLC status report. As an example, the RLC status report and the RRC completion message can be transmitted together using the UL grant obtained in response to transmitting the SR to the network.

At step 814, the WCD 712 optionally transitions to a non-pending state. As an example, a pending state is initially determined for the WCD as previously described with regards to step 802 (e.g., an RRC_INACTIVE_SR_PEND- ING state, a RC_CONNECTED_SR_PENDING state, etc.). Responsive to transmitting the RLC status report (e.g., step 810, etc.), the WCD 712 transitions from the pending state to a non-pending state (e.g., an RRC_INACTIVE state, an RRC_CONNECTED, state, etc.). The non-pending state is a state in which the WCD 712 is permitted to transmit a SR via random access procedure. In such fashion, the WCD 712 transitions to the non-pending state once the cause for an unnecessary random access procedure utilization has passed (e.g., once the RLC status report has been transmitted, etc.), therefore preserving the capacity for SR transmission via random access procedure by the WCD when necessary.

Figure 9:
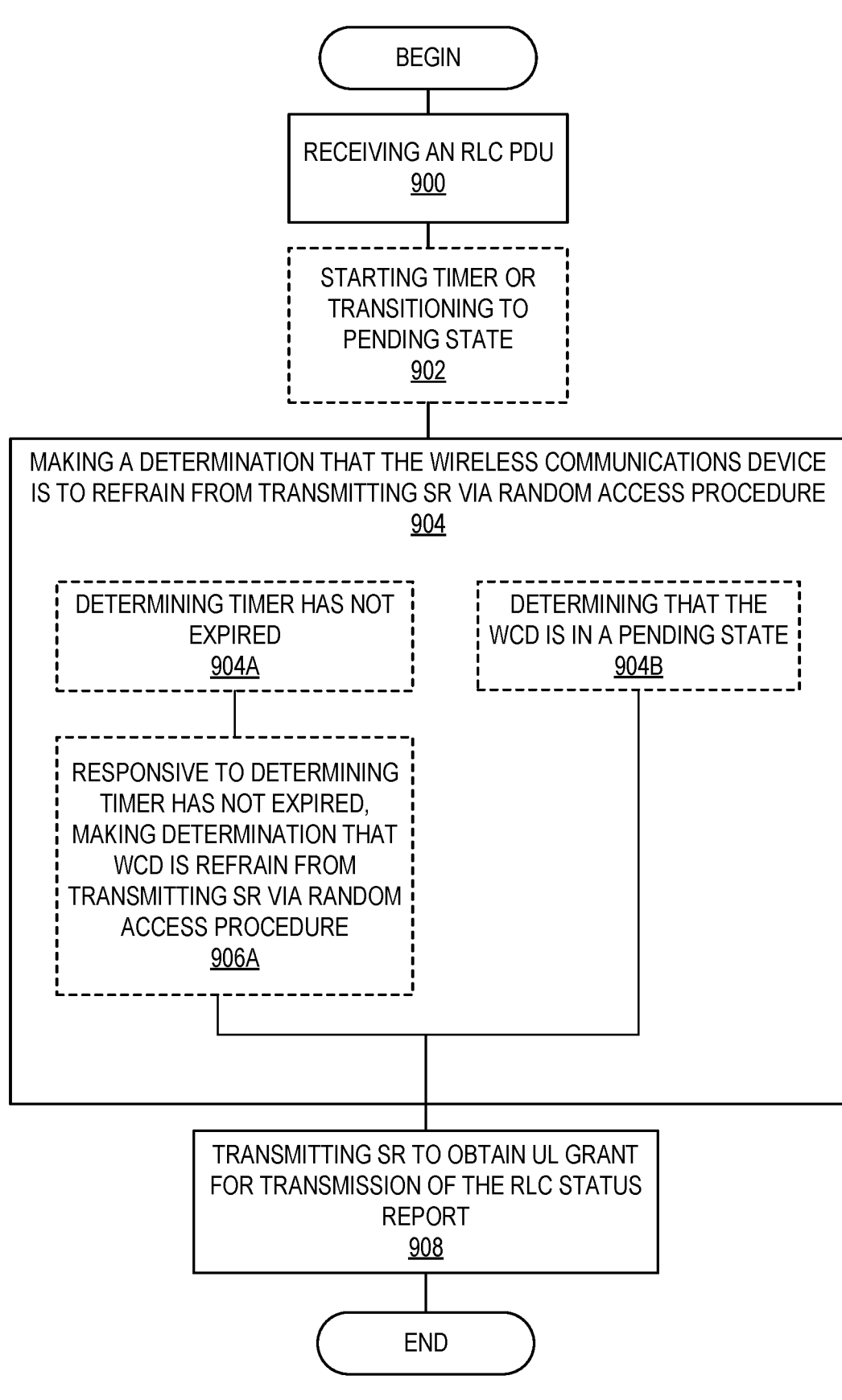
FIG. 9 is a flowchart illustrating a method implemented in a wireless communication device according to some embodiments of the present disclosure.

FIG. 9 is a flowchart illustrating a method performed by a WCD 712 in a wireless network in accordance with at least some aspects of the present disclosure. The wireless network may be or otherwise include the wireless communication system as described with regards to FIGS. 7 and/or 18.

At step 900, the WCD 712 receives a RLC PDU as previously described with regards to step 804 of FIG. 8.

Optionally, at step 902, the WCD 712 starts a timer or transition to a pending state as previously described with regards to step 802 of FIG. 8.

At step 904, the WCD 712 makes a determination that the WCD 712 is to refrain from transmitting a SR via random access procedure to obtain a UL grant for transmission of an RLC status report for the RLC PDU. Alternatively, or additionally, to make the determination at step 904, the WCD 712 determines that the timer has not expired at step 904A (e.g., the timer started at step 902). More particularly, the WCD 712 starts the timer at step 902 as previously described. Before the expiration of the timer, the WCD 712 makes a determination, optionally, that the timer has not expired at step 904A. Responsive to determining that the timer has not expired, the WCD 712 determines that the WCD 712 is prohibited from or is to otherwise refrain from transmitting a SR via random access procedure to obtain the UL grant for transmission of the RLC status report.

Alternatively, or additionally, at step 904B, to make the determination that the WCD 712 is to refrain from transmitting a SR via random access procedure, the WCD 712 determines that the WCD 712 is in or is to enter a pending state. For example, prior to step 904B, the WCD 712 may be in a non-pending state (e.g., an RRC_INACTIVE state, an RRC_CONNECTED state, etc.). Then, after transmitting either (a) an RRC request or (b) a SR via random access procedure to a network node, the WCD 712 determines that it is to enter the pending state (e.g., an RRC_INAC-TIVE_SR_PENDING state, a RC_CONNECTED_SR_PENDING state, etc.) in step 802. The pending state is a state in which the WCD 712 is prohibited from or otherwise refrains from transmitting a SR via random access procedure.

At step 908, the WCD 712 transmits a SR via the at least one PUCCH resource(s) to obtain the UL grant for subsequent transmission of the RLC status report (e.g., alongside an RRC completion message, etc.) as previously described with regards to step 810 of FIG. 8.

Figure 10:
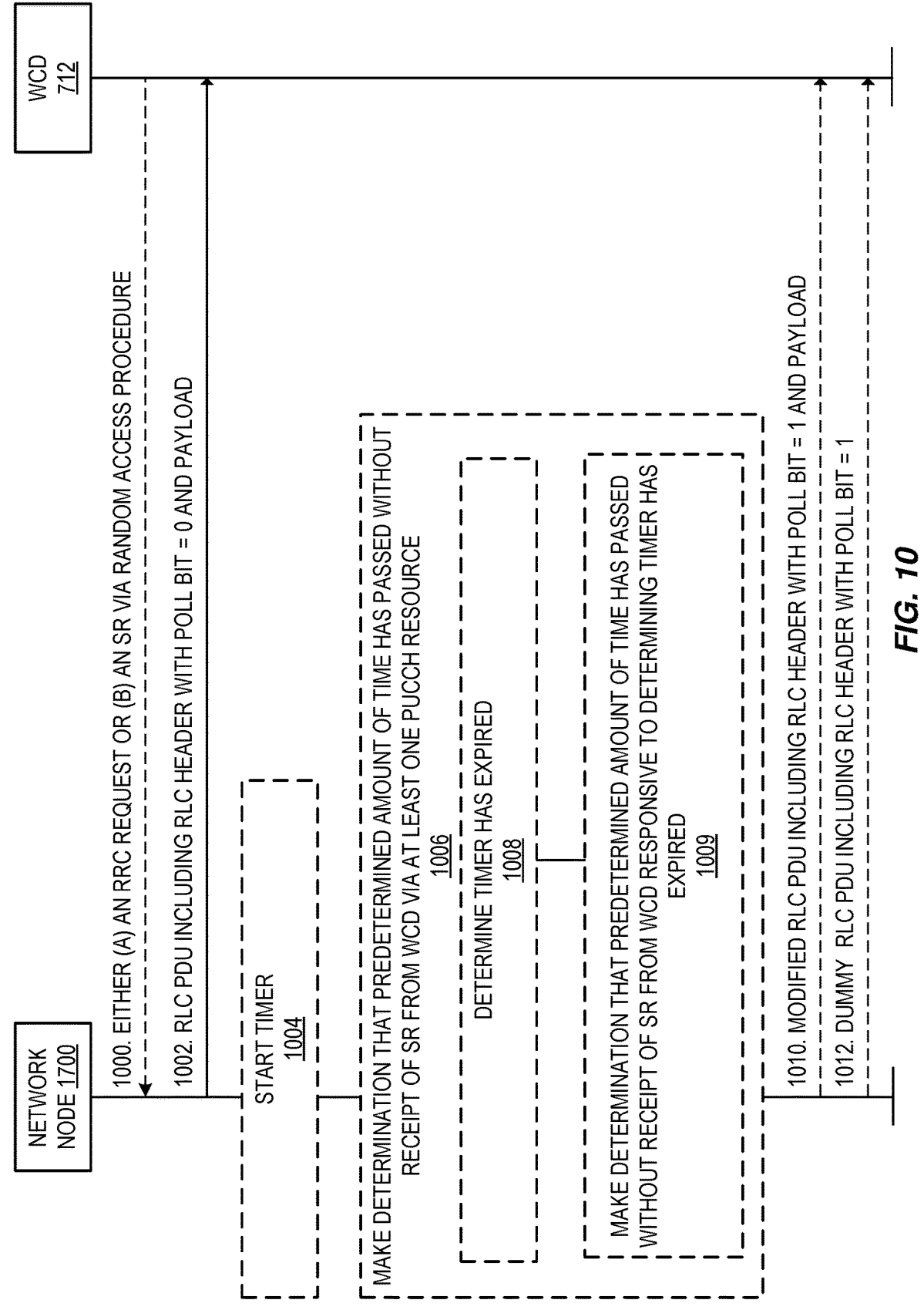
FIG. 10 illustrates the operation of a network node to reduce random access procedure utilization according to some embodiments of the present disclosure.

FIG. 10 illustrates the operation of a network node 1700 (e.g., a network node (e.g., gNB-CU) that implements part of the functionality of a base station 702, etc.) according to some embodiments of the present disclosure. Note that according to some embodiments, one or more steps in FIG. 10 can be performed, while other steps are optional. For example, step(s) indicated by a dashed box or dashed line may be optional (e.g., step 1004, etc.).

At step 1000, the network node 1700, optionally, receives either (a) a RRC request or (b) a SR via random access procedure from the WCD 712. As an example, the network node 1700 may receive a RRC reestablishment request or a RRC resume request from the WCD 712 over dedicated PUCCH resource(s) previously provided by the network node 1700 to the WCD 712 (e.g., responsive to a previously received RRC message from the WCD 712, etc.).

At step 1002, the network node 1700 transmits a RLC PDU to the WCD 712. The RLC PDU includes a RLC header and a payload that includes a RRC message (e.g., a RRC reconfiguration message). The RLC header includes an indication of an instruction that the WCD 712 is to refrain from transmitting a RLC status report (e.g., a RLC acknowledgement, a RLC negative acknowledgement, etc.) for the RLC PDU. In one embodiment, indication included in the RLC header is a poll bit (e.g., a RLC AM polling bit) that is set to a non-positive value (e.g., "0", "–1", etc.). The non-positively set poll bit indicates an instruction to the WCD 712 to refrain from transmitting the RLC status report for the RLC PDU to the network node 1700. The RRC message included in the payload of the RLC PDU may be, e.g., a RRC reconfiguration message, etc. The RRC message includes information that indicates one or more PUCCH resources configured for the WCD 712 for SR transmission (e.g., first symbol(s), duration(s), Physical Resource Block (PRB) offset(s), cyclic shift index set(s), etc. of the PUCCH resource(s)).

Optionally, at step 1004, the network node 1700 starts a timer (e.g., a "srWaitTimer". In one embodiment, the network node 1700 starts the timer after waiting for a period of time after transmitting either (A) the RRC request or (B) the SR at step 1000. In one embodiment, optionally, the network node 1700 stores the RLC PDU transmitted to the WCD 712 in a retransmission buffer until expiration of the timer.

Conventionally, the RLC header of a RLC PDU transmitted to a WCD (e.g., WCD 712, etc.) includes a poll bit set to a positive value, therefore instructing the WCD (e.g., WCD 712) to transmit a RLC status report. In turn, this instructed RLC status report transmission requires the WCD to transmit a SR to obtain a UL grant for the RLC status report transmission, which leads to unnecessary utilization of random access procedure (e.g., as previously described with regards to FIG. 8, etc.). By instead transmitting a RLC PDU with a RLC header including a poll bit set to a non-positive value (e.g., "0", etc.), the network node 1700 indicates instructions for the WCD 712 to refrain from transmitting the RLC status report, obviating the need to transmit a SR via random access procedure for a UL grant and therefore significantly increasing network efficiency (e.g., processing cycle utilization, power utilization, etc.).

However, by including an indication of an instruction to refrain from transmitting the RLC status report in the RLC header of the RLC PDU, the network node 1700 cannot verify whether the RLC PDU was properly received and decoded at the WCD 712. As such, without transmission of the RLC status report, the network node 1700 must determine whether the RLC PDU was properly received and processed at the WCD 712.

More specifically, the network node 1700 optionally, at step 1006, makes a determination that a predetermined amount of time has passed without receipt of a SR from the WCD 712 via at least one of the one or more PUCCH resources indicated by the RRC message. In one embodiment, to make the determination at step 1006, the network node 1700 optionally, at step 1008, first determines that the timer started at step 1004 has expired.

Responsive to determining that the timer has expired, the network node 1700 optionally, at step 1009, makes the determination that the predetermined amount of time has passed without receipt of the SR from the WCD 712 via the PUCCH resource(s) indicated in the RRC message. Additionally, in some embodiments, responsive to making the determination step 1008, the network node 1700, optionally, retransmits the RLC PDU stored in the retransmission buffer as described with regards to step 1004. Alternatively, if the network node 1700 determines that a SR has been received over the dedicated PUCCH resource(s) during or after the timer, the network node optionally empties the retransmission buffer, as the receipt of the SR via the PUCCH resource(s) indicates that the RLC PDU stored in the retransmission buffer was successfully received and decoded at the WCD 712 and therefore no longer needed.

In some embodiments, responsive to making the determination that a predetermined amount of time has passed without receipt of a SR from the WCD 712 via at least one of the one or more PUCCH resources, the network node 1700, optionally, at step 1010, transmits a modified RLC PDU to the WCD 712. The modified RLC PDU includes the RRC message (e.g., a RRC reconfiguration message, etc.) as previously described with regards to step 1002. The modified RLC PDU also includes a modified RLC header. The modified RLC header includes an indication of an instruction that the WCD 712 is to transmit a RLC status report for the modified RLC PDU. In one embodiment, the modified RLC PDU transmitted to the WCD 712 at step 1010 at least partially includes the RLC PDU stored in the retransmission buffer as described with regards to step 1004. In one embodiment, the modified RLC PDU is transmitted to the WCD 712 at step 1010 if the RLC SDU for the RRC message is transmitted using more than one MAC transport block (e.g., the RLC SDU is segmented).

Alternatively, in some embodiments, the network node 1700 optionally, at step 1012, transmits a dummy RLC PDU to the WCD 712. The dummy RLC PDU includes a modified RLC header. The modified RLC header includes an indication of an instruction that the WCD 712 is to transmit an RLC status report for the dummy RLC PDU. In one embodiment, the dummy RLC PDU lacks a payload. Alternatively, in one embodiment, the dummy RLC PDU includes a payload without a RRC message or with an empty RRC message.

Figure 11:
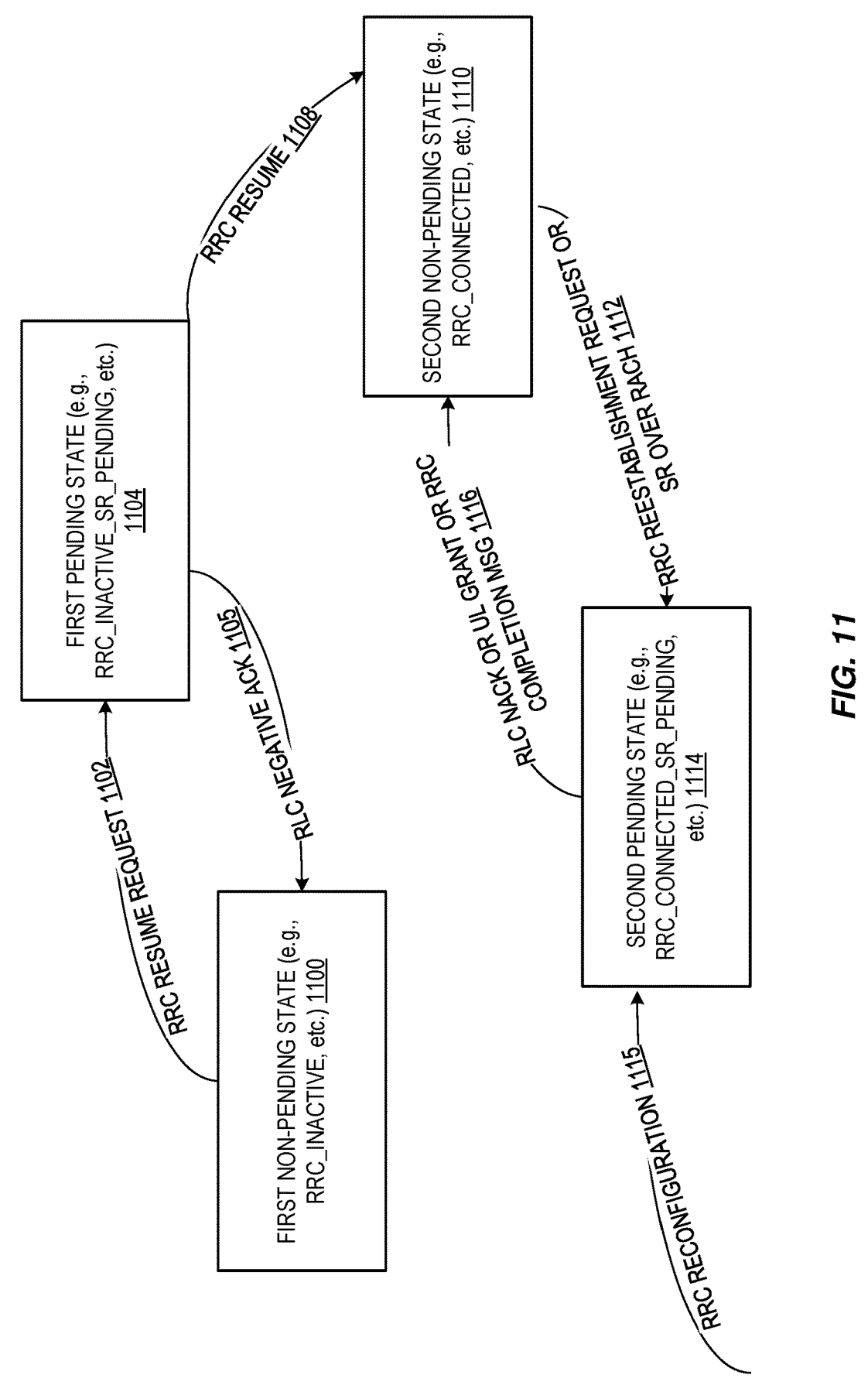
FIG. 11 illustrates a state flow diagram for control states of a wireless communication device according to some embodiments of the present disclosure.

FIG. 11 illustrates a state flow diagram for control states of a wireless communications device according to some embodiments of the present disclosure. More particularly, a WCD (e.g., WCD 712 of FIG. 1, etc.) is in a first non-pending state 1100. The first non-pending state 1100 is a state in which the WCD is permitted to permit transmission of a SR via random access procedure. As an example, the first non-pending state 1100 can be an RRC_INACTIVE state.

Figure 2:
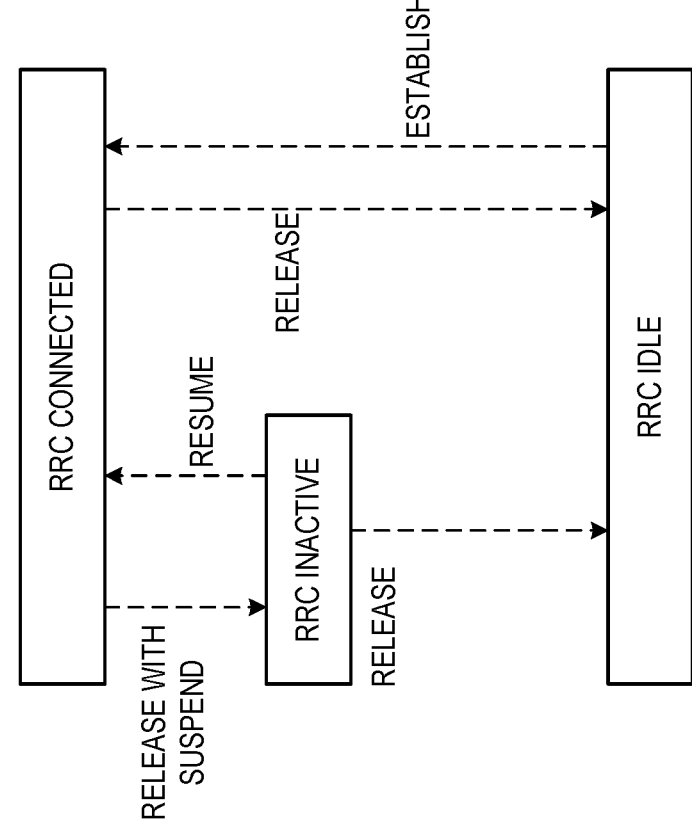
FIG. 2 depicts a data flow diagram for an example RRC inactive state introduced in the 3GPP NR.

When the WCD is in the first non-pending state 1100, the decision to transmit a RRC resume request 1102 to a network node (e.g., network node 1700 of FIG. 2, etc.) will transition the WCD from the first non-pending state 1100 to a first pending state 1104 to allow the WCD's L3 layer to finish processing an expected RRC Resume message 1108 from the network, which includes dedicated PUCCH resources configured for SR transmission for the WCD to request a UL grant for eventual RLC status report transmission. The first pending state 1104 is a state in which the WCD is prohibited from or otherwise refrains from transmitting a SR via random access procedure. For example, the WCD may transition from an RRC_INACTIVE state (e.g., the first non-pending state 1100) to an RRC_INAC-TIVE_SR_PENDING state (e.g., first non-pending state 1104).

In some embodiments, if the decoding of the RLC PDU that includes the RRC resume message 1108 fails, the WCD will make a decision to send a RLC negative acknowledge-ment 1105 to the network node. This decision will transition the WCD from the first pending state 1104 to the first non-pending state 1100 to initiate SR via random access procedure to obtain a UL to deliver RLC STATUS PDU to the network node. For example, the WCD may transition from the RRC_INACTIVE_SR_PENDING state back to the RRC_INACTIVE state.

Receiving the RRC resume message 1108 transitions the WCD from the first pending state 1104 to a second non-pending state 1110. Similarly to the first non-pending state 1100, the second non-pending state 1110 permits the WCD to permit transmission of a SR via random access procedure. For example, the WCD can transition from an RRC_INAC-TIVE_SR_PENDING state to an RRC_CONNECTED state (e.g., the second non-pending state 1110). In the second non-pending state 1110, the WCD will determine to transmit either a scheduling request or a RRC reestablishment request 1112 (e.g., to initiate a RRC reestablishment procedure, etc.)

Transmitting the SR via random access procedure or the RRC reestablishment request 1112 will transition the WCD from the second non-pending state 1110 to the second pending state 1114. For example, the WCD may transfer from an RRC_CONNECTED state to an RRC_CONNECT-ED_SR_PENDING state (e.g., the second pending state 1114). The second pending state 1114 is a state in which the WCD is prohibited from or otherwise refrains from trans-mitting a SR via random access procedure.

In the second pending state 1114, the WCD may be transitioned back to the second non-pending state 1110. In one embodiment, the WCD will receive and process RRC reconfiguration message 1115 in the second pending state 1114, which will transition back to the second non-pending state 1110. In another embodiment, the WCD will receive but fail to decode the RRC reconfiguration message 1115 in the second pending state 1114. In response, the WCD will transition to the second non-pending state to transmit a SR for transmission of a RLC STATUS PDU. In another embodiment, the WCD will receive a UL grant from the network that indicates no PUCCH SR resource(s) will be reconfigured by the network in the second pending state 1114 and will transition back to the second non-pending state 1110.

Figure 12:
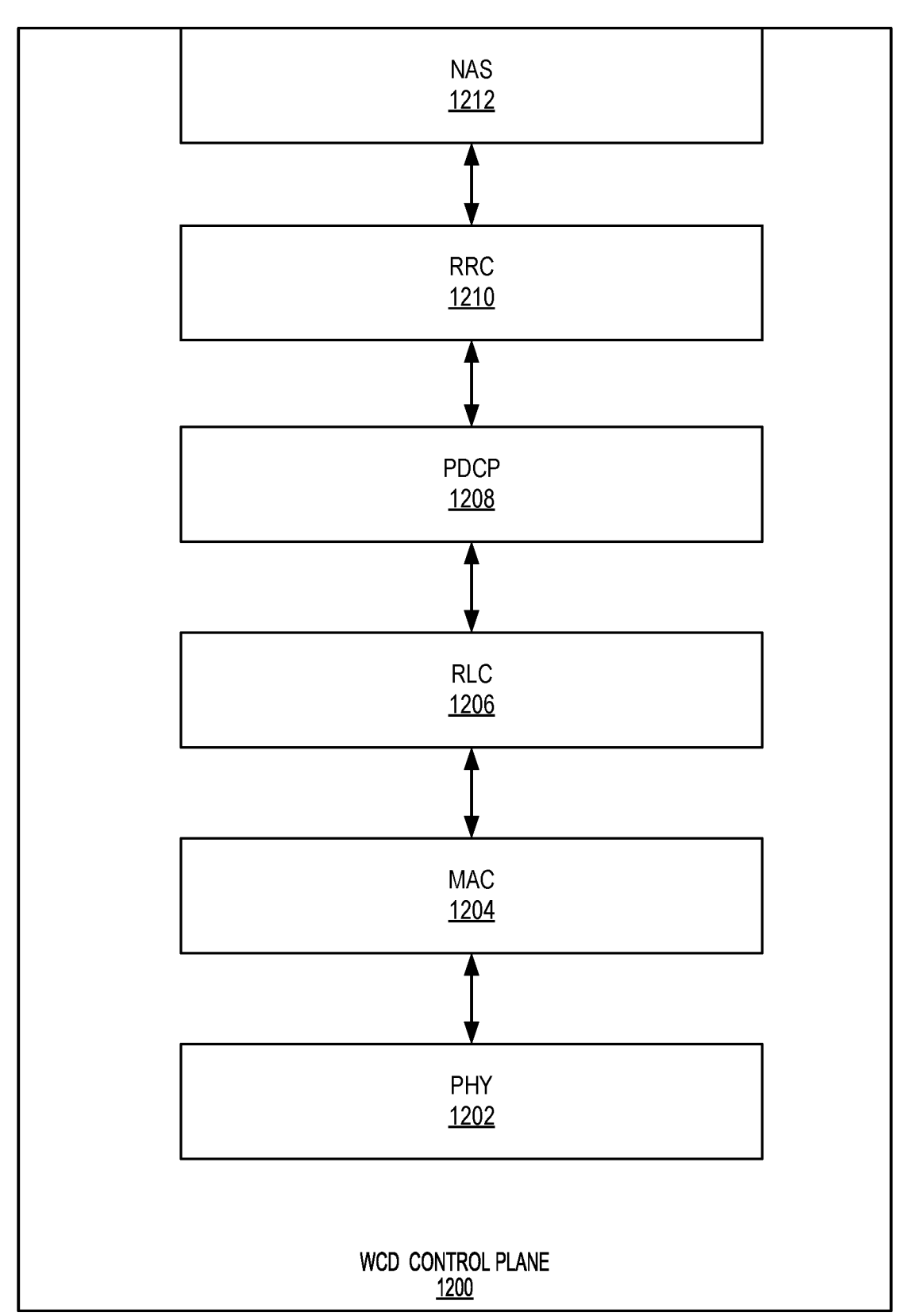
FIG. 12 depicts a control plane protocol stack including a plurality of protocol layers for a wireless communication device according to some embodiments of the present disclosure.

FIG. 12 depicts a control plane including a plurality of control plane layers for a wireless communication device according to some embodiments of the present disclosure. More particularly, the control plane 1200 can include a Physical (PHY) layer 1202, a MAC layer 1204, a RLC layer 1206, a PDCP layer 1208, a RRC layer 1210, and/or a Non-Access Stratum (NAS) layer 1212.

In some implementations, the layers 1202-1212 of the WCD control plane 1200 receives and/or processes data in the order depicted (e.g., layer 1202 to layer 1204 to layer 1206, etc.). As an example, the RLC layer 1206 receives RLC PDU data that includes an RLC header and an RRC message. The RLC header indicates instructions the WCD to generate and transmit a RLC status report. The RLC layer 1206 determines that the RLC PDU includes an RRC message. The RRC message is provided to the RRC layer 1210 for decoding. Meanwhile, the RLC layer 1206 generates the RLC status report and provide the RLC status report to a different layer for transmission (e.g., the PHY layer 1202).

As described previously, as the RLC layer 1206 is gen-erally described as a "lower" level layer than the RRC layer 1210, and therefore, in some circumstances, may process data more quickly than a "higher" level layer such as the RRC layer 1210. As such, to follow the previous example, the RLC layer 1206 generally generates the RLC status report and provide the RLC status report for transmission before the RRC layer 1210 decodes the RRC message to obtain PUCCH resources that should be used for the trans-mission of the RLC status report (e.g., by the PHY layer 1202, etc.). In turn, this leads to the transmitting layer (e.g., the PHY layer 1202, etc.) instead transmitting a SR over RACH, as the PUCCH resources are not available, leading to the problems described previously in the present disclo-sure.

Figure 13:
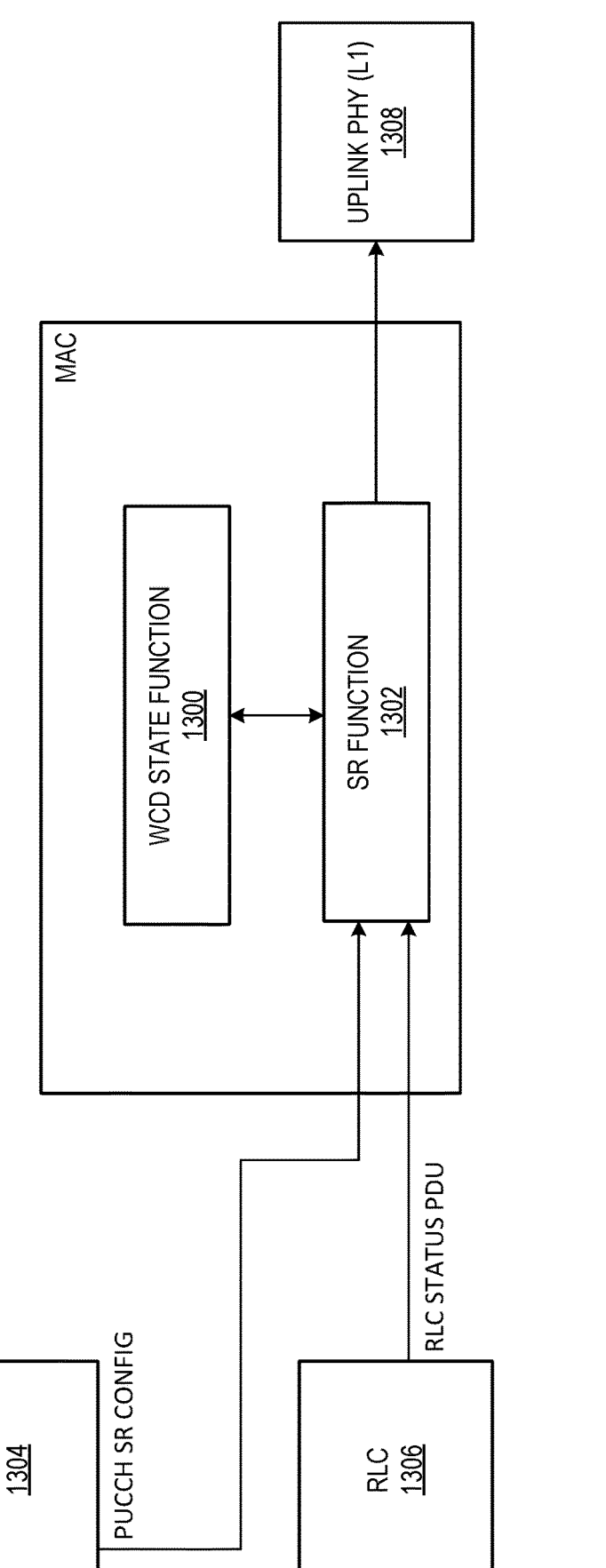
FIG. 13 depicts a data flow diagram for RRC state monitoring functions for a wireless communications device according to some embodiments of the present disclosure.

FIG. 13 depicts a data flow diagram for RRC state monitoring functions for a wireless communications device according to some embodiments of the present disclosure. More specifically, the WCD state function 1300 tracks the current state that the WCD is in. WCD states tracked by the WCD state function 1300 include existing 3GPP RRC states, such as RRC_INACTIVE, RRC_CONNECTED, etc. Addi-tionally, RRC_INACTIVE_SR_PENDING and RRC_CO-NNECTED_SR_PENDING states are introduced to assist the SR function 1302 in whether a SR over PUCCH resource(s) or a SR via random access procedure will be ordered to the Uplink PHY (L1) for transmission.

More specifically, the SR function 1302 tracks the avail-ability of PUCCH SR resource configuration from the RRC (L3) layer 1304 upon arrival of UL data without an existing UL grant from the network, such as RLC STATUS PDU data from the RLC layer 1306. As an example, if the WCD state function 1300 tracks the WCD as being in an RRC_CON-NECTED state, and PUCCH SR resources exist for the WCD from the RRC (L3) layer 1304, the SR function 1302 will order a transmission of a SR using PUCCH resource(s) to the uplink PHY 1308. As another example, if the WCD state function 1300 tracks the WCD as being in an RRC_I-NACTIVE state, or in an RRC_CONNECTED state but without PUCCH SR resource(s) from the RRC (L3) layer 1304, the SR function 1302 orders SR transmission over RACH to be used at the Uplink PHY (L1) layer 1308.

Figure 14:
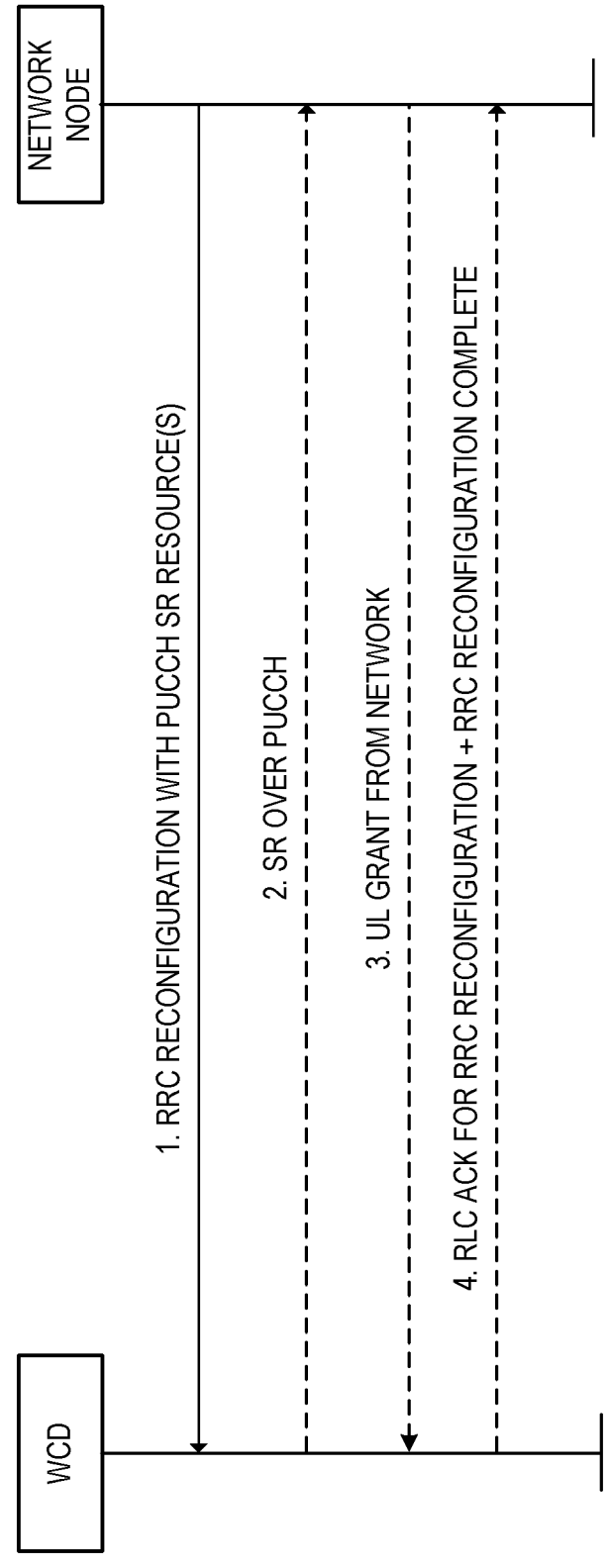
FIG. 14 depicts a data flow diagram for reducing random access procedure utilization for RRC reconfiguration procedure according to some embodiments of the present disclosure.

FIG. 14 depicts a data flow diagram for reducing random access procedure utilization for RRC reconfiguration proce-dure according to some embodiments of the present disclo-sure. More particularly, as depicted in FIG. 4, conventional steps as currently defined in the 3GPP NR cause the WCD to unnecessarily utilize SR over PRACH (e.g., random access procedure, etc.) at step 2. For example, at step 1 of FIG. 4, the WCD receives a RLC PDU including the RRC reconfiguration message with PUCCH resource(s) for SR transmission. However, given that RLC is a layer 2 (L2) protocol and the RRC Reconfiguration message is part of the L3 procedure delivered as the SDU of RLC, the RLC status report will always be generated and sent to L1 for transmis-sion before the PUCCH SR resource configuration is avail-able to be used by L1. As a result, the WCD transmits the SR over Physical Random Access Channel (PRACH) at step 2 of FIG. 4, rather than utilizing the PUCCH SR resource(s) received at step 1.

Conversely, as illustrated by FIG. 14, example aspects of the present disclosure allow for decoding and utilization of PUCCH resource(s). More particularly, the WCD receives the PUCCH SR resource(s) at step 1 of FIG. 14. Unlike the current 3GPP NR procedure illustrated in FIG. 4, the WCD refrains from transmitting a SR until the PUCCH SR resource(s) received at step 1 are processed and available to the WCD. The WCD then transmits the SR over the PUCCH resource(s) at step 2 of FIG. 14, therefore reducing a utilization of random access procedure by the WCD when performing RRC reconfiguration procedure.

Figure 6:
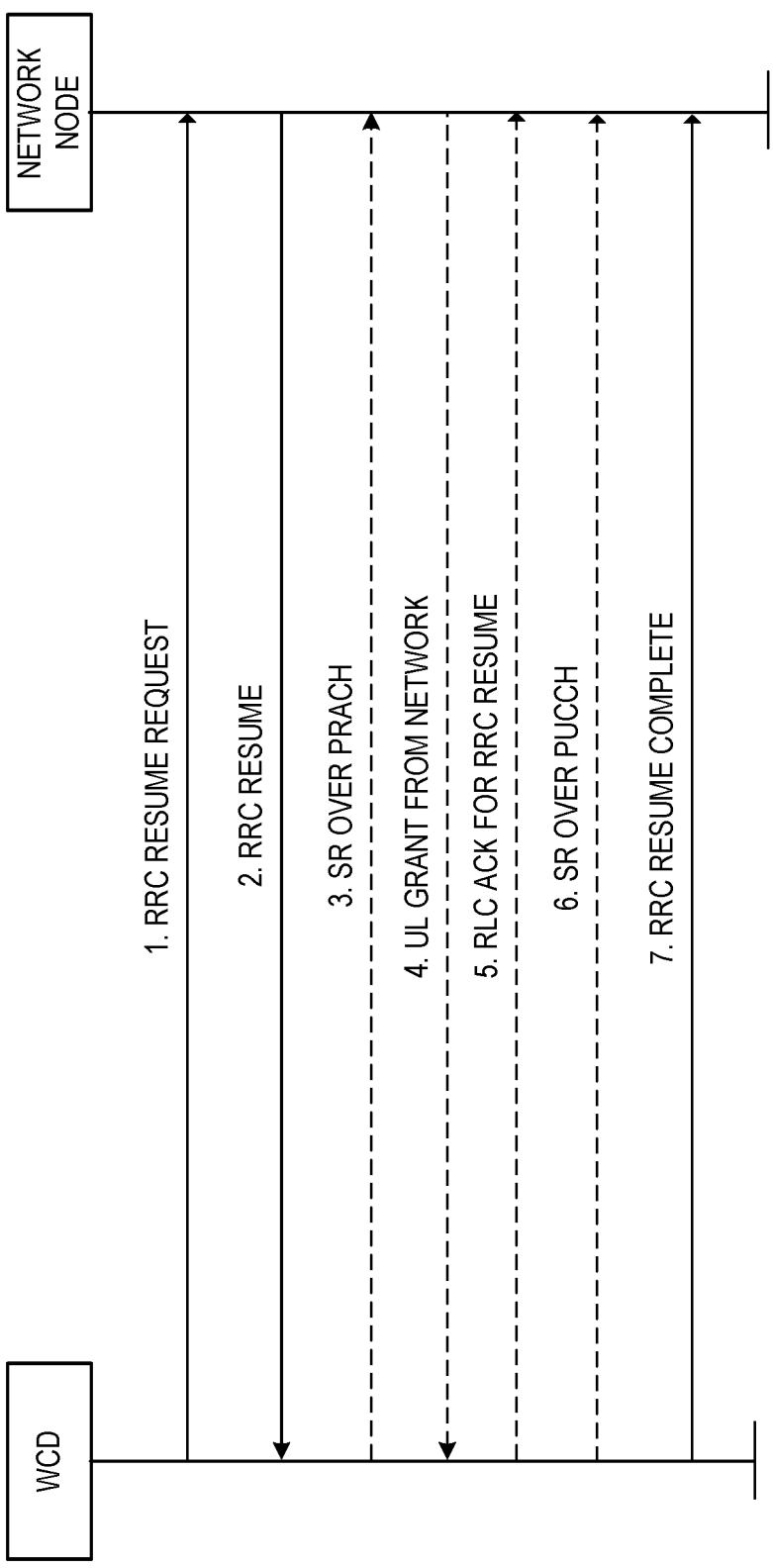
FIG. 6 depicts a data flow diagram of an example utilization of random access procedure caused by RRC resume procedure as currently defined in the 3GPP NR.
Figure 15:
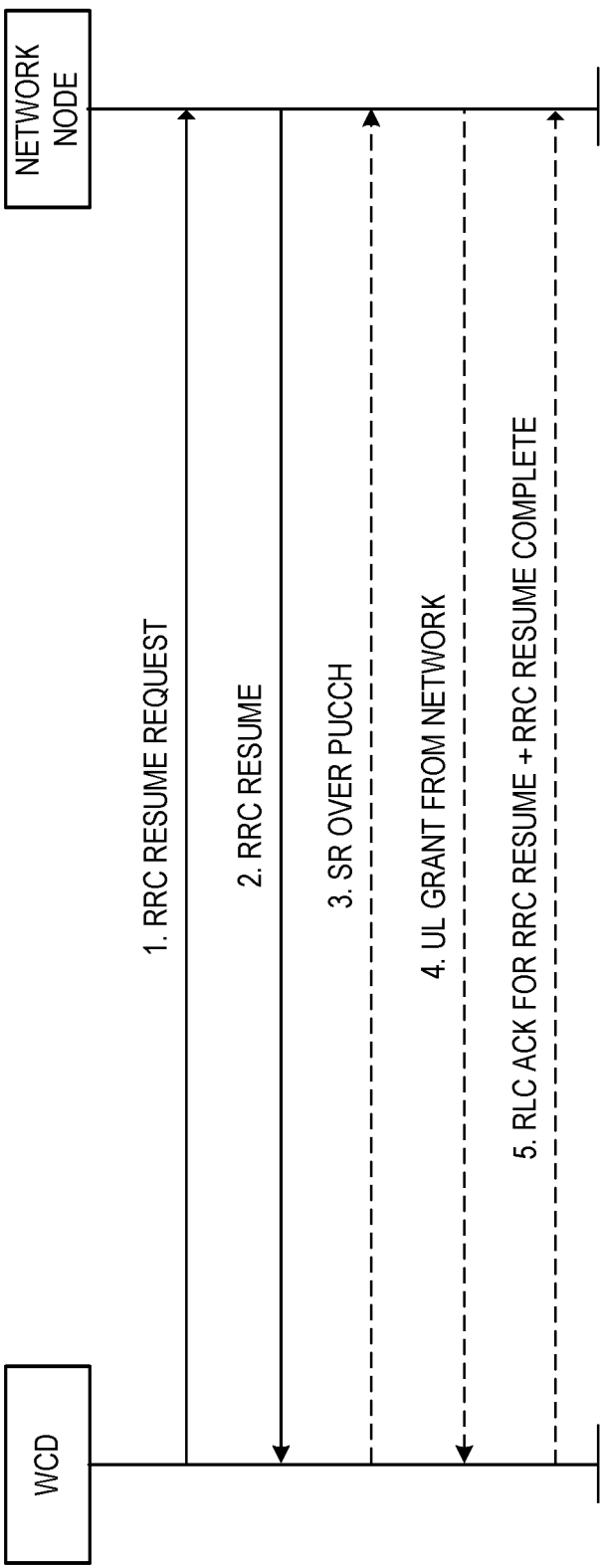
FIG. 15 depicts a data flow diagram for reducing random access procedure utilization for RRC resume procedure according to some embodiments of the present disclosure.

Similarly, FIG. 15 depicts a data flow diagram for reducing random access procedure utilization for RRC resume procedure according to some embodiments of the present disclosure. As depicted in FIG. 6, RRC resume procedure, as currently defined by in the 3GPP NR, causes unnecessary utilization of random access procedure when the WCD transmits a SR over PRACH at step 3 by transmitting a SR before PUCCH resources received at step 2 in the RLC PDU including the RRC Resume message. Conversely, as depicted in FIG. 15, example aspects of the present disclosure instruct the WCD to refrain from transmitting the SR until the PUCCH resource(s) received at step 2 in the RLC PDU including the RRC Resume message are available for utilization. The WCD then transmits the SR over the PUCCH resource(s) at step 3 of FIG. 15, therefore reducing a utilization of random access procedure by the WCD when performing RRC resume procedure.

Figure 5:
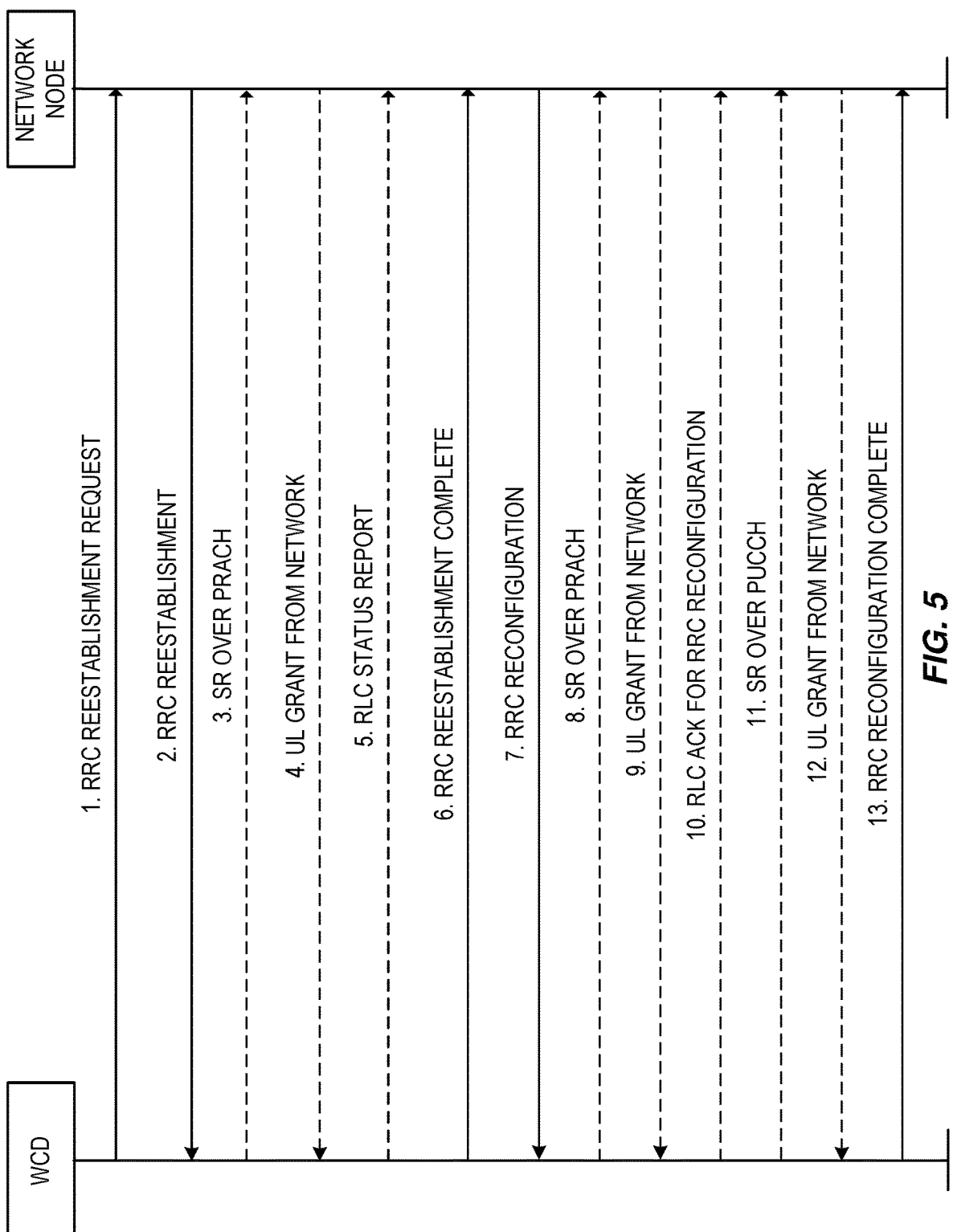
FIG. 5 depicts a data flow diagram of an example utilization of random access procedure caused by RRC reestablishment and RRC reconfiguration procedures as currently defined in the 3GPP NR.
Figure 16:
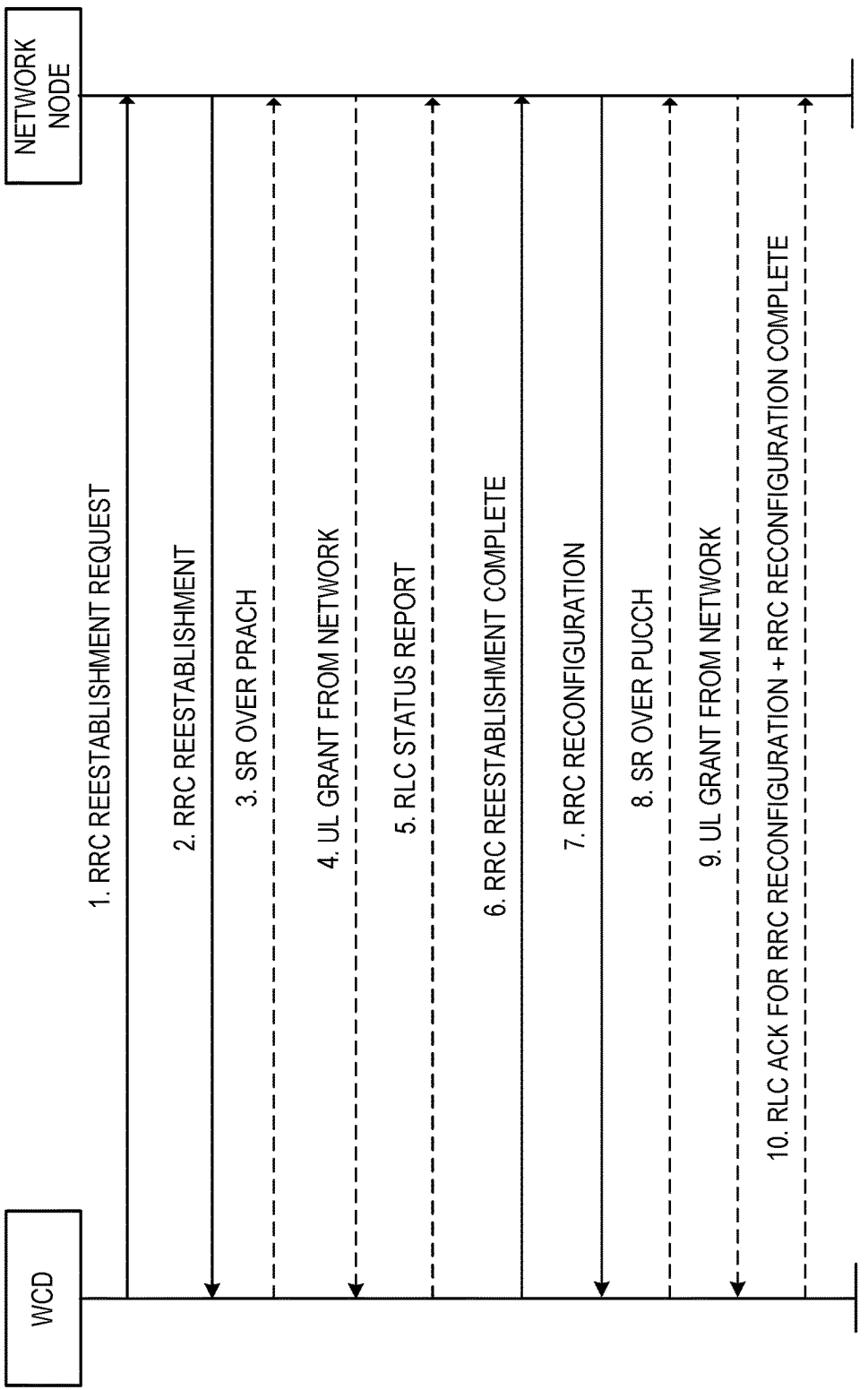
FIG. 16 depicts a data flow diagram for reducing random access procedure utilization for RRC reestablishment procedure according to some embodiments of the present disclosure.

Similarly, FIG. 16 depicts a data flow diagram for reducing random access procedure utilization for RRC reestablishment procedure according to some embodiments of the present disclosure. As depicted in FIG. 5, RRC reestablishment procedure, as currently defined by in the 3GPP NR, causes unnecessary utilization of random access procedure when the WCD transmits a SR over PRACH to request grant for transmission of the RLC acknowledgement message rather than refraining from SR transmission until PUCCH resources received at step 7 are available.

Additionally, the random access utilization at step 8 of FIG. 5 causes additional downstream inefficiencies. For example, as illustrated in FIG. 5, the network must transmit an additional SR over PUCCH at step 11 to receive a UL grant from the network at step 12, therefore causing an unnecessary utilization of PUCCH resources(s).

Conversely, as depicted in FIG. 16, example aspects of the present disclosure instruct the WCD to refrain from transmitting the SR until the PUCCH resource(s) received at step 7 in the RLC PDU including the RRC reconfiguration message are available for utilization. The WCD then transmits the SR over the PUCCH resource(s) at step 8 of FIG. 16, therefore reducing a utilization of random access procedure by the WCD when performing RRC resume procedure, and also eliminating additional PUCCH utilization as depicted in steps 8-12 of FIG. 5.

Figure 17:
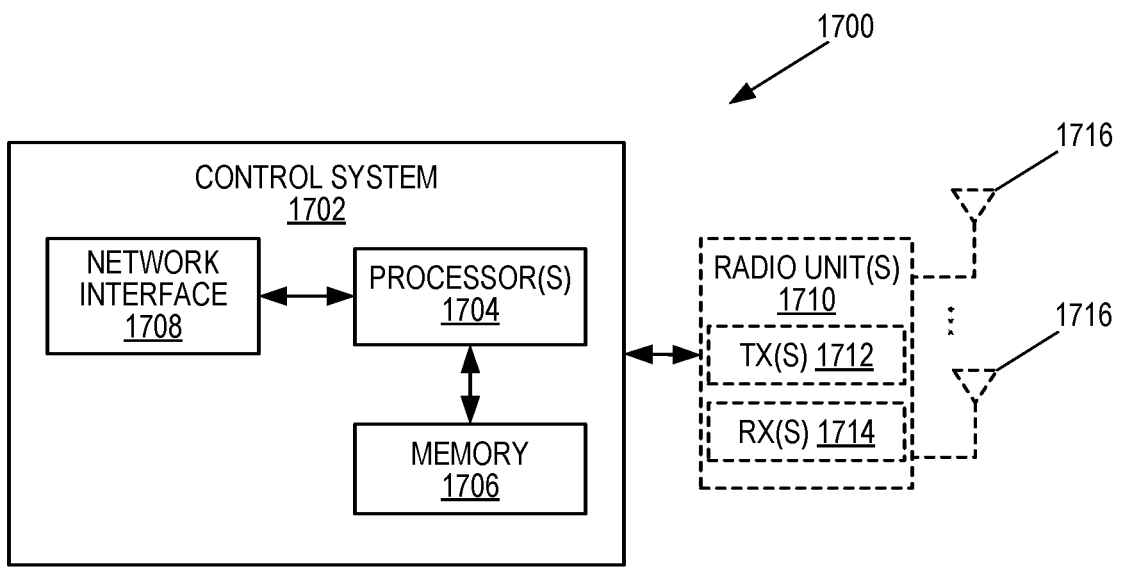
FIG. 17 is a schematic block diagram of a network node according to some embodiments of the present disclosure.

FIG. 17 is a schematic block diagram of a network node 1700 according to some embodiments of the present disclosure. Optional features are represented by dashed boxes. The network node 1700 may be, for example, a base station 702 or 706 or a network node that implements all or part of the functionality of the base station 702 or gNB described herein. As illustrated, the network node 1700 includes a control system 1702 that includes one or more processors 1704 (e.g., Central Processing Units (CPUs), Application Specific Integrated Circuits (ASICs), Field Programmable Gate Arrays (FPGAs), and/or the like), memory 1706, and a network interface 1708. The one or more processors 1704 are also referred to herein as processing circuitry. In addition, the network node 1700 may include one or more network units 1710 (e.g., radio unit(s), etc.) that each includes one or more transmitters 1712 and one or more receivers 1714 coupled to one or more antennas 1716. The network units 1710 may be referred to or be part of network interface circuitry. In some embodiments, the network unit(s) 1710 is external to the control system 1702 and connected to the control system 1702 via, e.g., a wired connection (e.g., an optical cable). However, in some other embodiments, the network unit(s) 1710 and potentially the antenna(s) 1716 are integrated together with the control system 1702. The one or more processors 1704 operate to provide one or more functions of the network node 1700 as described herein (e.g., one or more functions of the network node as described herein with respect to FIGS. 8 and/or 10). In some embodiments, the function(s) are implemented in software that is stored, e.g., in the memory 1706 and executed by the one or more processors 1704.

Figure 18:
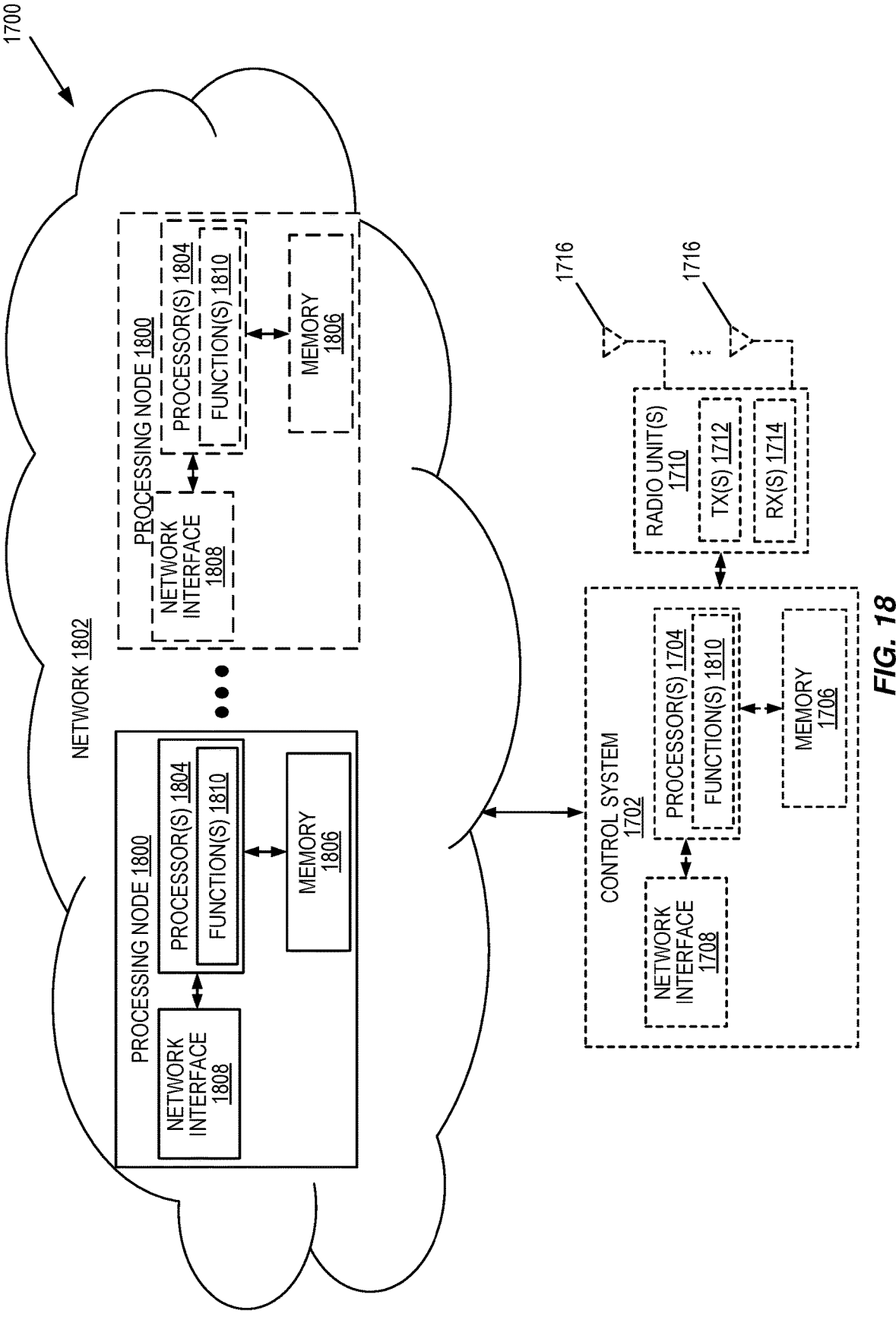
FIG. 18 is a schematic block diagram that illustrates a virtualized embodiment of the network node of FIG. 17 according to some embodiments of the present disclosure.

FIG. 18 is a schematic block diagram that illustrates a virtualized embodiment of the network node 1700 according to some embodiments of the present disclosure. As used herein, a "virtualized" network node is an implementation of the network node 1700 in which at least a portion of the functionality of the network node 1700 is implemented as a virtual component(s) (e.g., via a virtual machine(s) executing on a physical processing node(s) in a network(s)). As illustrated, in this example, the network node 1700 may include the control system 1702 and/or the one or more radio units 1710, as described above. The control system 1702 may be connected to the radio unit(s) 1710 via, for example, an optical cable or the like. The network node 1700 includes one or more processing nodes 1800 coupled to or included as part of a network(s) 1802. If present, the control system 1702 or the radio unit(s) are connected to the processing node(s) 1800 via the network 1802. Each processing node 1800 includes one or more processors 1804 (e.g., CPUs, ASICs, FPGAs, and/or the like), memory 1806, and a network interface 1808.

In this example, functions 1810 of the network node 1700 described herein (e.g., one or more functions of the network node as described herein with respect to FIGS. 8 and/or 10) are implemented at the one or more processing nodes 1800 or distributed across the one or more processing nodes 1800 and the control system 1702 and/or the radio unit(s) 1710 in any desired manner. In some particular embodiments, some or all of the functions 1810 of the network node 1700 described herein are implemented as virtual components executed by one or more virtual machines implemented in a virtual environment(s) hosted by the processing node(s) 1800. As will be appreciated by one of ordinary skill in the art, additional signaling or communication between the processing node(s) 1800 and the control system 1702 is used in order to carry out at least some of the desired functions 1810. Notably, in some embodiments, the control system 1702 may not be included, in which case the radio unit(s) 1710 communicate directly with the processing node(s) 1800 via an appropriate network interface(s).

In some embodiments, a computer program including instructions which, when executed by at least one processor, causes the at least one processor to carry out the functionality of the network node 1700 or a node (e.g., a processing node 1800) implementing one or more of the functions 1810 of the network node 1700 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 19:
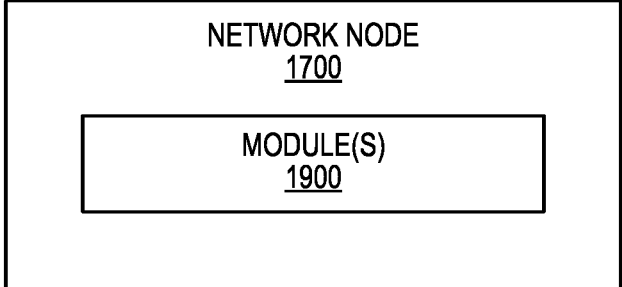
FIG. 19 is a schematic block diagram of the network node of FIG. 17 according to some other embodiments of the present disclosure.

FIG. 19 is a schematic block diagram of the network node 1700 according to some other embodiments of the present disclosure. The network node 1700 includes one or more modules 1900, each of which is implemented in software. The module(s) 1900 provide the functionality of the network node 1700 described herein. This discussion is equally applicable to the processing node 1800 of FIG. 18 where the modules 1900 may be implemented at one of the processing nodes 1800 or distributed across multiple processing nodes 1800 and/or distributed across the processing node(s) 1800 and the control system 1702.

Figure 20:
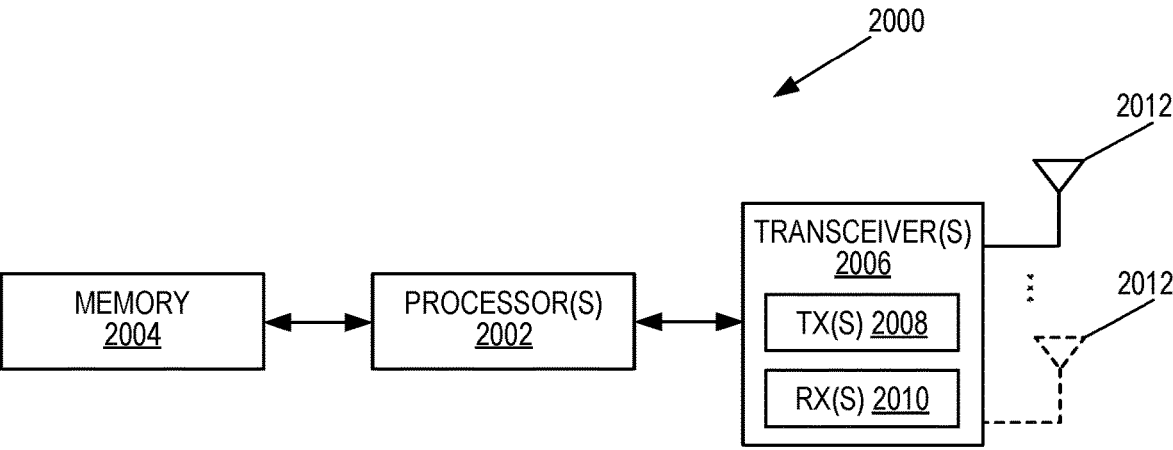
FIG. 20 is a schematic block diagram of a wireless communications device according to some embodiments of the present disclosure.

FIG. 20 is a schematic block diagram of a WCD 712 according to some embodiments of the present disclosure. As illustrated, the WCD 712 includes one or more processors 2002 (e.g., CPUs, ASICs, FPGAs, and/or the like), memory 2004, and one or more transceivers 2006 each including one or more transmitters 2008 and one or more receivers 2010 coupled to one or more antennas 2012. The transceiver(s) 2006 includes radio-front end circuitry connected to the antenna(s) 2012 that is configured to condition signals communicated between the antenna(s) 2012 and the processor(s) 2002, as will be appreciated by on of ordinary skill in the art. The processors 2002 are also referred to herein as processing circuitry. The transceivers 2006 are also referred to herein as radio circuitry. In some embodiments, the functionality of the WCD 712 described above (e.g., functionality of the WCD 712 described above with respect to FIGS. 8, 9, and/or 11) may be fully or partially implemented in software that is, e.g., stored in the memory 2004 and executed by the processor(s) 2002. Note that the WCD 712 may include additional components not illustrated in FIG. 20 such as, e.g., one or more user interface components (e.g., an input/output interface including a display, buttons, a touch screen, a microphone, a speaker(s), and/or the like and/or any other components for allowing input of information into the WCD 712 and/or allowing output of information from the WCD 712), a power supply (e.g., a battery and associated power circuitry), etc.

In some embodiments, a computer program including instructions which, when executed by at least one processor, causes the at least one processor to carry out the functionality of the WCD 712 according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 21:
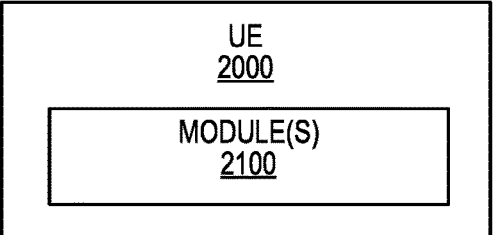
FIG. 21 is a schematic block diagram of the wireless communication device of FIG. 20 according to some other embodiments of the present disclosure.

FIG. 21 is a schematic block diagram of the WCD 712 according to some other embodiments of the present disclosure. The WCD 712 includes one or more modules 2100, each of which is implemented in software. The module(s) 2100 provide the functionality of the WCD 712 described herein.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processors (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

At least some of the following abbreviations may be used in this disclosure. If there is an inconsistency between abbreviations, preference should be given to how it is used above. If listed multiple times below, the first listing should be preferred over any subsequent listing(s).

3GPP Third Generation Partnership Project
5G Fifth Generation
5GC Fifth Generation Core
5GS Fifth Generation System
AM Acknowledged Mode
AMF Access and Mobility Function
ASIC Application Specific Integrated Circuit
AUSF Authentication Server Function
CCE Control Channel Element
CPU Central Processing Unit
DCI Downlink Control Information
DN Downlink
DN Data Network
DSP Digital Signal Processor
eNB Enhanced or Evolved Node B
EPC Evolved Packet Core
EPS Evolved Packet System
E-UTRA Evolved Universal Terrestrial Radio Access
FPGA Field Programmable Gate Array
gNB New Radio Base Station
gNB-DU New Radio Base Station Distributed Unit
HSS Home Subscriber Server
IoT Internet of Things
LTE Long Term Evolution
MAC Medium Access Control
MME Mobility Management Entity
MTC Machine Type Communication
NAS Non-Access Stratum
NEF Network Exposure Function
NF Network Function
NG Next Generation
NR New Radio
NRF Network Function Repository Function
NSSF Network Slice Selection Function
PC Personal Computer
PCF Policy Control Function
PDCP Packet Data Convergence
PDSCH Physical Downlink Shared Channel
PDU Protocol Data Unit
P-GW Packet Data Network Gateway
PHY Physical
PRACH Physical Random Access Channel
PRB Physical Resource Block
PUCCH Physical Uplink Control Channel
RACH Random Access Channel
RAM Random Access Memory
RAN Radio Access Network
RAR Random Access Response
RLC Radio Link Control ROM Read Only Memory
RRC Radio Resource Control
RRH Remote Radio Head
SCEF Service Capability Exposure Function
SDU Service Data Unit
SMF Session Management Function
SR Scheduling Request
SRB1 Signaling Radio Bearer 1
TCI Transmission Configuration Indicator
TM Transfer Mode
TRP Transmission/Reception Point
TTI Transmit Time Interval
UDM Unified Data Management
UE User Equipment
UL Uplink
UL-DCCH Uplink Dedicated Control Channel
UL-DTCH Uplink Dedicated Traffic Channel
UM Unacknowledged Mode
UPF User Plane Function
WCD Wireless Communication Device Those skilled in the art will recognize improvements and modifications to the embodiments of the present disclosure. All such improvements and modifications are considered within the scope of the concepts disclosed herein.

The invention claimed is:

1. A method performed by a wireless communication device for reducing utilization of a random access procedure, the method comprising:

transmitting either (a) a Radio Resource Control, RRC, request or (b) a scheduling request, SR, via a random access procedure;

receiving a Radio Link Control, RLC, Protocol Data Unit, PDU, comprising an RLC header and a payload that comprises an RRC message, the RLC header comprising an indication of an instruction to transmit an RLC status report for the RLC PDU, and the RRC message comprising information that indicates one or more Physical Uplink Control Channel, PUCCH, resources configured for SR transmission;

responsive to transmitting either the RRC request or the SR via the random access procedure, making a determination that the wireless communication device is to refrain from transmitting a SR via the random access procedure to obtain an Uplink, UL, grant for transmission of the RLC status report for the RLC PDU, making the determination that the wireless communication device is to refrain from transmitting a SR via the random access procedure comprising determining that the wireless communication device is in a pending state, the pending state being a state in which the wireless communication device is prohibited from transmitting a SR via the random access procedure; and responsive to making the determination, transmitting a SR on at least one PUCCH resource of the one or more PUCCH resources configured for SR transmission indicated in the RRC message to obtain the UL grant for the transmission of the RLC status report for the RLC PDU.

2. The method of claim 1, wherein transmitting either (a) the RRC request or (b) the SR via the random access procedure comprises transmitting the RRC request.

3. The method of claim 2, wherein the RRC request comprises:

a RRC resume request; or
a RRC reestablishment request.

4. The method of claim 1, wherein transmitting either (a) the RRC request or (b) the SR via the random access procedure comprises transmitting the SR via the random access procedure in response to obtaining data via at least one of an Uplink Dedicated Control Channel (UL-DCCH) or an Uplink Dedicated Traffic Channel (UL-DTCH).

5. The method of claim 1, wherein the method further comprises, responsive to transmitting the SR, causing the wireless communication device to transition from the pending state to a non-pending state, wherein the non-pending state is a state in which the wireless communication device is permitted to permit transmitting a SR via the random access procedure.

6. The method of claim 1, further comprising decoding the RRC message to determine the at least one PUCCH resource of the one or more PUCCH resources configured for SR transmission.

7. The method of claim 1, further comprising:

starting a timer upon transmitting either (a) the RRC request or (b) the SR via the random access procedure; and making the determination that the wireless communication device is to refrain from transmitting the SR via the random access procedure comprises:

determining that the timer has not expired; and making the determination that the wireless communication device is to refrain from transmitting a SR via the random access procedure responsive to determining that the timer has not expired.

8. The method of claim 1, wherein the method further comprises transmitting the RLC status report on UL resources indicated by the UL grant obtained in response to transmitting the SR, and wherein the UL grant further comprises a RRC completion message.

9. The method of claim 1, wherein:

the RLC status report comprises:
a RLC acknowledgement; or
a RLC negative acknowledgement; and
the RRC message comprises:
a RRC reconfiguration message; or
a RRC resume message.

10. A wireless communication device for reducing utilization of a random access procedure, the wireless communication device comprising:

one or more transmitters;
one or more receivers; and
processing circuitry associated with the one or more transmitters and the one or more receiver, the processing circuitry configured to cause the wireless communication device to:

transmit either (a) a Radio Resource Control, RRC, request or (b) a Scheduling Request, SR, via a random access procedure;

receive a Radio Link Control, RLC, Protocol Data Unit, PDU, comprising an RLC header and a payload that comprises an RRC message, wherein the RLC header comprises an indication of an instruction to transmit an RLC status report for the RLC PDU, and the RRC message comprising information that indicates one or more Physical Uplink Control Channel, PUCCH, resources configured for SR transmission;

responsive to transmitting either the RRC request or the SR via the random access procedure, make a determination that the wireless communication device is to refrain from transmitting a SR via the random access procedure to obtain an Uplink, UL, grant for transmission of the RLC status report for the RLC PDU, making the determination that the wireless communication device is to refrain from transmitting a SR via the random access procedure comprising determining that the wireless communication device is in a pending state, the pending state being a state in which the wireless communication device is prohibited from transmitting a SR via the random access procedure; and responsive to making the determination, transmit a SR on at least one PUCCH resource of the one or more PUCCH resources configured for SR transmission indicated in the RRC message to obtain the UL grant for the transmission of the RLC status report for the RLC PDU.

11. The wireless communication device of claim 10, wherein the processing circuitry is further configured to, responsive to transmitting the RLC status report for the RLC PDU, cause the wireless communication device to transition from the pending state to a non-pending state, wherein the non-pending state is a state in which the wireless communication device (2000) is permitted to permit transmitting a SR via the random access procedure.

12. The wireless communication device of claim 10, the processing circuitry is further configured to decode the RRC message to determine the at least one PUCCH resource of the one or more PUCCH resources configured for SR transmission.

13. The wireless communication device of claim 10, wherein the wireless communication device refrains from transmitting a SR via the random access procedure until a predetermined amount of time has passed since transmitting either (a) the RRC request or (b) the SR via the random access procedure.

\*     \*     \*     \*     \*